US012586882B2

(12) United States Patent
Sirci et al.

(10) Patent No.: US 12,586,882 B2
(45) Date of Patent: Mar. 24, 2026

(54) COMBLINE WAVEGUIDE FILTER INCLUDING CAVITY RESONATORS COUPLED BY IRISES, WHERE THE CAVITY RESONATORS ARE EACH DEFINED BY A SHAPE THAT IS NON-RECTANGULAR

(71) Applicant: SWISSto12 SA, Renens (CH)

(72) Inventors: Stefano Sirci, Lausanne (CH); Esteban Menargues Gomez, Préverenges (CH); Santiago Capdevila Cascante, Renens (CH)

(73) Assignee: SWISSto12 SA, Renens (CH)

( * ) Notice: Subject to any disclaimer, the term of this patent is extended or adjusted under 35 U.S.C. 154(b) by 262 days.

(21) Appl. No.: 18/255,615

(22) PCT Filed: Dec. 3, 2021

(86) PCT No.: PCT/IB2021/061314
§ 371 (c)(1),
(2) Date: Jun. 2, 2023

(87) PCT Pub. No.: WO2022/118279
PCT Pub. Date: Jun. 9, 2022

(65) Prior Publication Data

US 2024/0021969 A1 Jan. 18, 2024

(30) Foreign Application Priority Data

Dec. 3, 2020 (FR) ....................................... 2012634

(51) Int. Cl.
*H01P 1/205* (2006.01)
*H01P 1/219* (2006.01)
*H01P 11/00* (2006.01)

(52) U.S. Cl.
CPC ............ *H01P 1/2053* (2013.01); *H01P 1/219* (2013.01); *H01P 11/001* (2013.01)

(58) Field of Classification Search
CPC ..................................................... H01P 1/2053
(Continued)

(56) References Cited

U.S. PATENT DOCUMENTS 5,534,881 A 7/1996 Young et al.
2010/0141357 A1 6/2010 Gonzalez et al.
(Continued)

FOREIGN PATENT DOCUMENTS

EP 0068504 B1 2/1986
WO 2017208153 A1 12/2017

OTHER PUBLICATIONS

International Search Report for PCT/IB2021/061314 dated Feb. 23, 2022.
Written Opinion for PCT/IB2021/061314 dated Feb. 23, 2022.

*Primary Examiner* — Benny T Lee
(74) *Attorney, Agent, or Firm* — McDonald Hopkins LLC

(57) ABSTRACT

A combline waveguide filter obtained by additive printing, including several resonators connected to each other by irises. Each resonator includes a cavity with a longitudinal axis, a transverse axis and a vertical axis. Each cavity is delimited in particular by two walls each extending in a plane perpendicular to the longitudinal axis. Each cavity may include a post extending parallel to the vertical axis inside the cavity. The cross-section of the cavities is non-rectangular.

23 Claims, 33 Drawing Sheets

(58) Field of Classification Search
USPC .......................................................... 333/203
See application file for complete search history.

(56) References Cited

U.S. PATENT DOCUMENTS

| | | | | |
|---|---|---|---|---|
| 2014/0225685 | A1* | 8/2014 | Chun et al. ........... | H01P 1/2053 333/202 |
| 2014/0347147 | A1 | 11/2014 | Shi et al. | |
| 2015/0280302 | A1* | 10/2015 | Seo et al. .............. | H01P 11/007 333/209 |
| 2017/0263996 | A1 | 9/2017 | Karhu | |
| 2020/0194855 | A1 | 6/2020 | Hollenbeck et al. | |

* cited by examiner

COMBLINE WAVEGUIDE FILTER INCLUDING CAVITY RESONATORS COUPLED BY IRISES, WHERE THE CAVITY RESONATORS ARE EACH DEFINED BY A SHAPE THAT IS NON-RECTANGULAR

RELATED APPLICATIONS

This application claims priority from French patent application No FR2012634 of Dec. 3, 2020, the contents whereof are entirely incorporated.

TECHNICAL FIELD

The present invention relates to a combline waveguide filter and a method of making such filters.

BACKGROUND ART

Radio frequency (RF) signals can propagate either in free space or in waveguide devices.

An example of such a conventional waveguide is described in patent application WO2017208153, the content of which is incorporated by reference. It consists of a hollow device, the shape and proportions of which determine the propagation characteristics for a given wavelength of the electromagnetic signal. The internal channel section of this device is rectangular. Other channel cross-sections are suggested in this document, including circular shapes.

The waveguide 1 of this prior art comprises a core produced by additive manufacturing by superimposing layers on one another. This core delimits an internal channel intended for guiding waves, the cross-section of which is determined according to the frequency of the electromagnetic signal to be transmitted. The inner surface of the core is covered with a conductive metal layer. The external surface can also be covered with a conductive metal layer which contributes to the rigidity of the device.

Waveguide devices are used to channel RF signals or to manipulate such devices in the spatial or frequency domain, for example to form a waveguide filter. In particular, the present invention relates to passive waveguide filters that allow filtering of radio frequency signals without the use of active electronics.

Conventional waveguide filters used for radio frequency signals typically have internal apertures of rectangular or circular cross section. The primary purpose of these filters is to suppress unwanted frequencies and pass desired frequencies with minimal attenuation. Attenuations greater than 100 dB or even 120 dB may be required for filters intended for reception and/or transmission systems in the space domain for example.

Space or aeronautical applications in particular require compact and light waveguide filters. Consequently, important research efforts have been carried out in order to propose waveguide filter geometries that can satisfy these different objectives.

Evanescent mode filters, or combline filters, are for example known. They are essentially composed of several small cavities (below the cutoff frequency) that transmit electromagnetic energy between an input port and an output port. The successive cavities are connected by irises whose dimensions help determine the bandwidth of the filter. Several peaks or posts allow the propagation of the fundamental mode. This type of filters is used for example for the input and output stages of satellite payloads, because of their high selectivity and their reduced mass and size.

Conventional combline waveguide filters are made by machining and assembling different metal subassemblies. These operations are complex and costly. In addition, the weight of the filters thus produced is significant.

SUMMARY OF THE INVENTION

An aim of the present invention is to provide a new type of combline waveguide filter that is simpler to manufacture and whose weight is reduced.

According to one aspect, these goals are achieved by means of a combline waveguide filter made of metal by a process including an additive manufacturing step.

The filter may be manufactured by a process including an additive manufacturing step, for example of the SLM type in which a laser or electron beam melts or sinters several thin layers of a powder material.

The additive manufacturing can be seen on the filter thus produced by analyzing the structure of the metal grains thus sintered in layers.

Additive metal manufacturing allows complex shapes to be made by limiting or eliminating assembly steps, thereby reducing manufacturing costs.

Additive manufacturing also allows for the manufacture of combline waveguide filters without or with a reduced number of assembly means between subcomponents, which also reduces the weight of the filter.

Waveguide devices are known to be manufactured by additive printing. However, the complex shapes of combline waveguide filters do not lend themselves to additive manufacturing due to the many cantilevered surfaces, especially the surfaces forming the roof of the resonator cavities.

Most additive printing processes, including selective laser melting (SLM) processes, require a minimum angle, such as 20° or 40°, to avoid the risk of sagging of a newly deposited cantilevered layer. This makes it impossible to print certain portions of the waveguide filter, or at least to print them with the desired precision.

FIG. **27*a* illustrates a process that can be implemented for additive manufacturing of a combline waveguide filter 1. In this manufacturing method, the filter has a for example rectangular cross-section and is printed with a longitudinal direction x of the filter 1** that is inclined with respect to the printing direction p, i.e., with respect to the direction p perpendicular to the printing layers. For this purpose, the printing is carried out on a printing substrate S with an inclined plane. This oblique arrangement avoids or limits horizontal overhangs during printing. However, this results in manufacturing tolerance problems, related on the one hand to the manufacturing tolerances of the substrate and its positioning on the printing table, and on the other hand to the printing layers ("strata") that are oblique in relation to the main dimensions of the filter. These tolerance problems degrade the characteristics of the filter, in particular with respect to selectivity, the precision of the cut-off frequency, and the attenuation of the useful radio frequency signal. Moreover, the printed object occupies a large surface on the printing table, and requires a large number of printing layers, resulting on the one hand in a slow printing and on the other hand in additional inaccuracies by adding the manufacturing tolerances of the layers.

In order to avoid these disadvantages, it is proposed in another aspect that a combline waveguide filter with an unconventional geometry be realized in additive printing, which facilitates high precision additive printing.

To this end, according to one aspect, the combline waveguide filter is provided with at least two resonators, preferably at least four resonators, comprising a cavity provided with a longitudinal axis x, a transverse axis y and a vertical axis z, each cavity being delimited in particular by two walls each extending in a plane perpendicular to the longitudinal axis, the cross section of the cavities being non-rectangular.

The term "combline waveguide filter" implies that the individual resonators are interconnected by irises. This does not necessarily imply that the resonators are aligned on a single longitudinal or transverse line.

The choice of a non-rectangular cross-section provides additional freedom to make cavities that can be made by metal additive printing with a printing direction p parallel to the longitudinal axis x of the filter, as in FIG. 27*b*, or perpendicular to that longitudinal direction, as in FIG. 27*c*.

In this way, it is possible to realize metallic waveguide filters in which the layers resulting from additive printing are not parallel to the roof surfaces of the cavities and can be printed without overhang.

This avoids the accuracy problems caused by additive printing on a substrate with an oblique printing surface.

In addition, the density of filters that can be printed simultaneously on a given surface is increased, or the height and number of printing layers is reduced, in both cases improving the speed of additive printing and thus reducing the cost.

Each cavity may include a post extending parallel to the vertical axis within the cavity.

The use of posts in the cavity allows the impedance of the cavity to be modified, thus controlling the resonant frequency of the circuit formed by the cavity and the iris.

In one embodiment, each cavity has a base perpendicular to the vertical axis and substantially planar, and a roof above the base, the roof lacking a planar surface parallel to the base. Thus, it is possible to manufacture the resonators by starting with the base supported by a horizontal printing surface, and then printing the cavity walls and roof which do not have cantilevered horizontal surfaces.

A post may extend from the base.

The roof may comprise exactly two panels formed by oblique faces connecting the walls and inclined with respect to the base.

The roof can have several flat panels, for example two panels, connected to each other and/or to the base by curved surfaces.

The roof may comprise exclusively curved surfaces connecting the walls together. This variant allows for a vaulted roof that is easier to print in additive printing.

The cross-section of the resonator may vary in the longitudinal direction.

The area of the cross-section may be increasing from each longitudinal end of the cavity toward the longitudinal center of the cavity. Thus, the maximum height of the resonator roof may be at the longitudinal center of the resonator, and the minimum height at one or both longitudinal ends. This increasing and then decreasing slope of the roof in the longitudinal direction facilitates its printing, as the longitudinal edge of the roof forms a self-supporting vault during printing.

At least two longitudinally adjacent cavities may be connected to each other by an iris.

This iris can cross the vertical walls of two adjacent resonators. An iris between two adjacent resonators in the longitudinal direction is referred to as a longitudinal iris.

The cross section of the longitudinal iris may be triangular.

The cross-section of the longitudinal iris may be polygonal, such as forming a quadrilateral, a rhombus, rectangle or square.

Multiple irises, such as two irises, may be provided between two longitudinally adjacent resonators. The cross-section of these irises may form a slot. The slot may extend vertically.

At least two transversely adjacent cavities may be connected to each other by an iris.

This iris can cross the roof of two adjacent resonators. An iris between two adjacent resonators in the transverse direction is called a transverse iris.

The transverse irises can form a polyhedron

The transverse iris may form a polyhedron with 4 triangular faces, with two of the faces in the planes of the two adjacent roofs being hollow in order to pass the radio frequency signal between the resonators.

The transverse iris can form a polyhedron with two pentagonal faces, two triangular faces and two trapezoidal faces, the pentagonal faces in the planes of the two roofs being hollow in order to allow the radio frequency signal to pass between the resonators.

The transverse irises may have a rectangular cross-section with the upper edge formed by the intersection of two panels of two interlocking cavities.

The transverse irises may occupy a curved volume, for example if the transverse irises are supported on non flat roofs.

A single combline waveguide filter may have multiple longitudinal irises of different shapes, and/or multiple transverse irises of different shapes or sections.

At least one cavity of a resonator may be provided with a tuning screw to create an obstruction in the cavity and adjust the resonance frequency. The tuning screw may extend vertically above the post and inserted more or less deeply into the cavity.

At least one iris may have a tuning screw to adjust the passband of the filter. The screw may extend vertically through the top wall of the iris, and into the iris.

At least one cavity may include a hole for chemical cleaning of the interior of the cavity after additive printing. This hole may be removed or modified after cleaning.

The comb waveguide filter may include at least two resonators, for example four or eight or more resonators, interconnected by irises.

The resonators and the irises can be realized in a monolithic way.

The combline waveguide filter may include an input port for coupling a radiofrequency electromagnetic signal into the filter and an output port for coupling the radiofrequency electromagnetic signal out of the filter.

The ports may be formed in machined flanges and assembled, for example by bonding, to the additively printed portion of the filter.

The ports may be provided with a connector for a coaxial cable.

According to one aspect, the invention also relates to a method of manufacturing a combline waveguide filter, comprising additively manufacturing the resonators by superimposing layers extending in planes perpendicular to the vertical axis.

The method may include machining a flange with an input port and a flange with an output port, and bonding the flanges to the cavities.

BRIEF DESCRIPTION OF THE FIGURES

Example embodiments of the invention are shown in the description illustrated by the appended figures in which.

DETAIL DESCRIPTION OF EMBODIMENTS OF THE INVENTION

Figure 1:
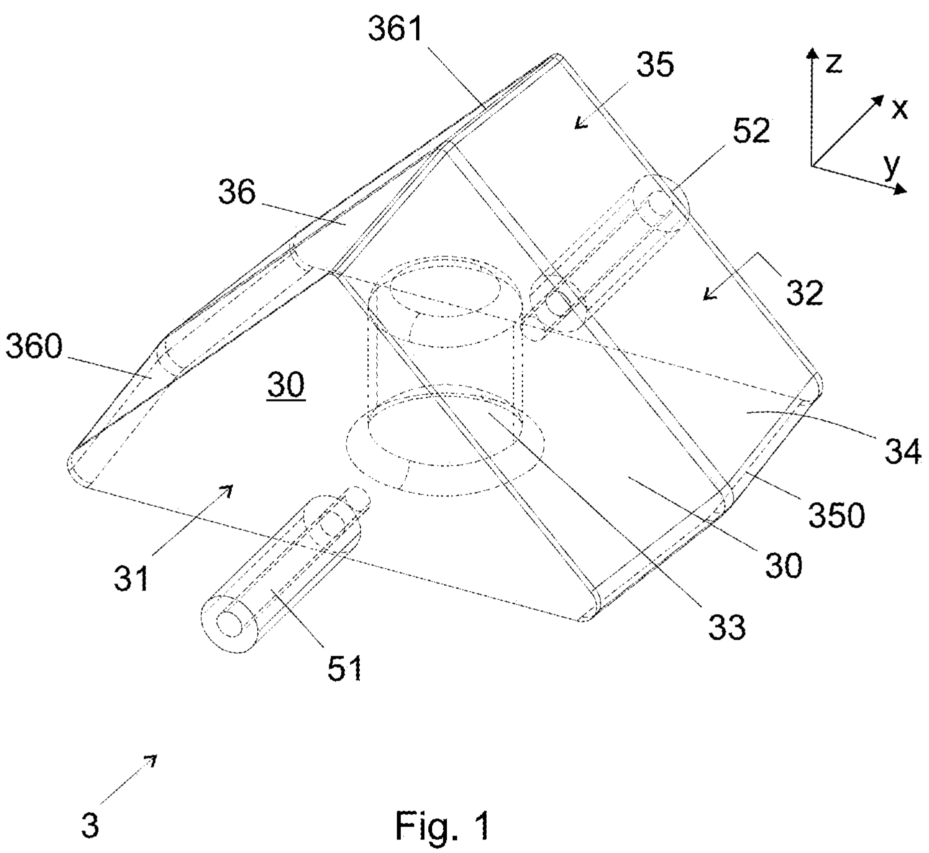
FIGS. 1 to 4, 5*a*, 5*b* and 6 illustrate different perspective views of different examples of resonators that can be implemented in a metal combline waveguide filter, the iris not being shown in these figures.

FIG. 1 illustrates a perspective view of an example of a resonator 3 that may be implemented in a metal combline waveguide filter. Only the resonator cavity is shown in this figure, and in FIGS. 2 through 6, with the iris(es) not shown.

The illustrated resonator 3 is provided with an input port 51 for an input radio frequency signal and an output port 52 for the filtered signal, although in practice this resonator is intended to be connected to other resonators via an iris or irises 4, as will be discussed later with respect to FIGS. 7*a*, 7*b*, 8*a*, 8*b*, 9 and 10.

The resonator 3 comprises a cavity 30 delimited by a base 34, a roof with two panels 35-36, and two vertical walls 31 and 32. The roof panel 35 is connected to the base by a curved surface 350, and to the other panel 36 by a second curved surface 361 forming the roof edge. The panel 36 is connected to the base 34 by a third curved surface 360. As in other embodiments, the curved surfaces 350, 360, 361 are curved in the x-y transverse plane. In this example, the curved surfaces 350, 360, 361 are not curved in the other planes.

Figure 27A:
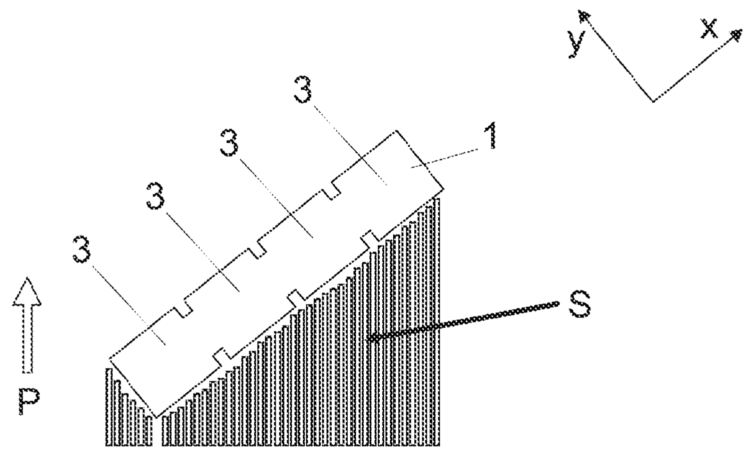
FIG. 27*a* illustrates a view of an example of a waveguide filter arrangement during additive printing.
Figure 27B:
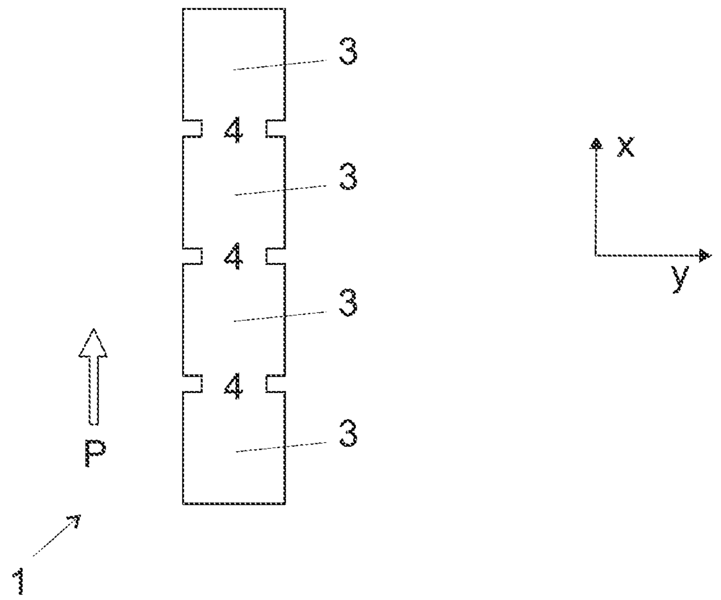
FIG. 27*b* illustrates a view of another example of a waveguide filter arrangement during additive printing.
Figure 27C:
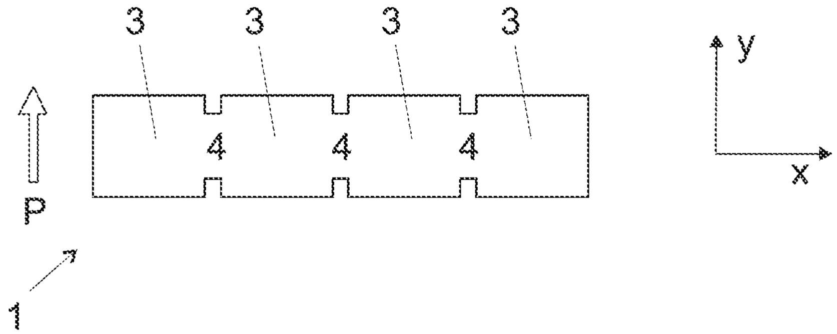
FIG. 27*c* illustrates a view of an example of a waveguide filter arrangement during additive printing.

The longitudinal axis x is parallel to the roof edge, and perpendicular to the vertical walls 31-32. The transverse axis y is perpendicular to the longitudinal axis x. The base 34 extends in the x-y plane, called the horizontal plane. The z-axis, called the vertical axis, is perpendicular to the x-y plane. It should be noted that the vertical axis corresponds to the printing direction p (e.g. see FIGS. 27*a*, 27*b* and 27*c*) during additive printing; this direction is therefore vertical during printing, but not necessary during the use of the filter, which can be implemented in any orientation.

The resonator preferably includes a post 33 that extends into the cavity 30 perpendicularly from the base, without reaching the roof 35-36. The height of the post defines the impedance of the resonator and thus the cutoff frequency of the filter for the fundamental mode.

The cross-section of the cavity 30, in the y-z plane, is non-rectangular, and substantially triangular in this example. The resonator is printed with the base 34 perpendicular to the printing direction, on the printing table. This geometry avoids cantilevered surfaces during printing.

Other examples of resonators and filters including such resonators are illustrated in the other figures and described below. For the sake of brevity, the features of these other resonators already presented and described in connection with FIG. 1, or with other figures, are not systematically repeated. All of the features described in connection with the resonator in the figure may, however, be used with the other resonators, except where otherwise specified.

Figure 24:
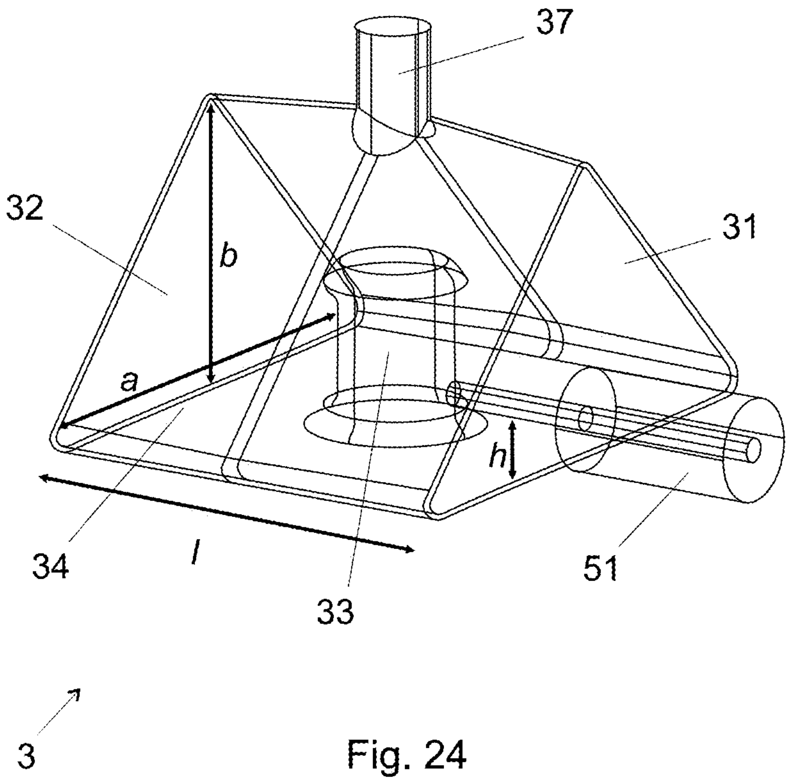
FIG. 24 illustrates a perspective view of an example of a resonator that can be implemented in a metal combline waveguide filter, provided with a threaded hole for a filter cutoff frequency tuning screw and a radio frequency signal input or output port.

FIG. 24 illustrates a resonator 3 having a cavity with a threaded hole 37, obtained by additive printing and/or machining, above the post 33.

The threaded hole allows a tuning screw 38 (e.g. see FIGS. 25 and 26) to be inserted from the edge of the roof 35-36 and vertically to the post 33; by adjusting the depth of insertion of this screw into the cavity, the cutoff frequency is adjusted. By inserting the screw deeper, the cut-off frequency fc of the filter is reduced.

Such a tuning screw can be provided with all the resonators written below.

The input port 51 allows a radio frequency signal to be introduced into the cavity 30, for example from a waveguide or coaxial cable. The height h along the z-axis of the center of the input port determines both the quality of the coupling and the quality factor Qe; the higher h, the better the coupling, but at the expense of the quality factor of the resonator.

Figure 2:
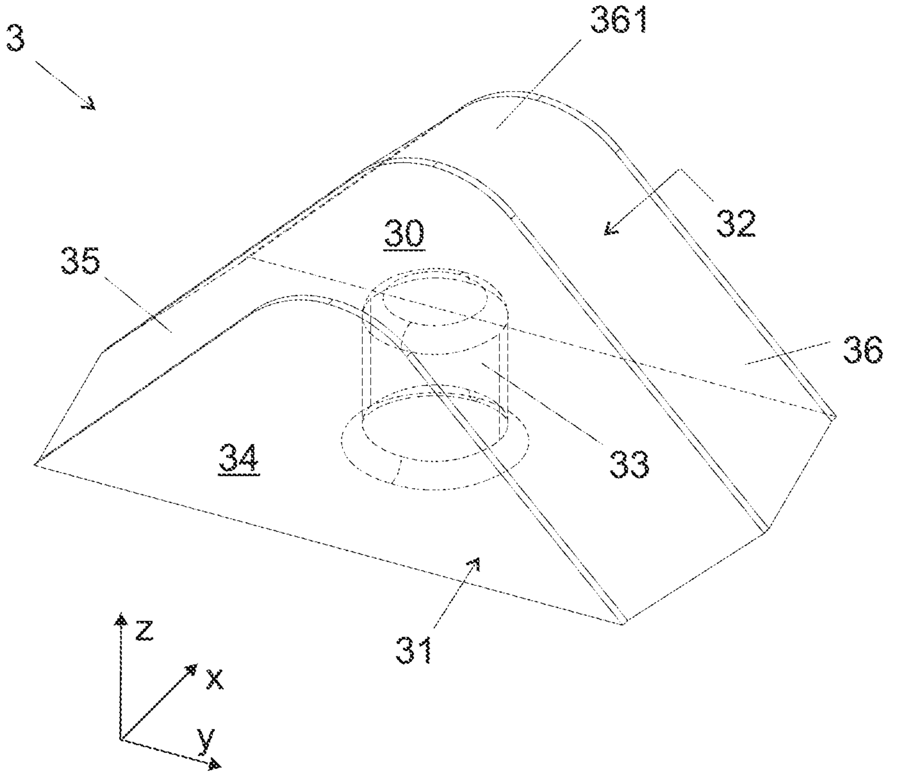

FIG. 2 illustrates another resonator 3 in which the roof panels 35-36 are connected to the base 34 by sharp edges, and connected to each other by a curved surface of larger radius than the embodiment in FIG. 1.

Figure 3:
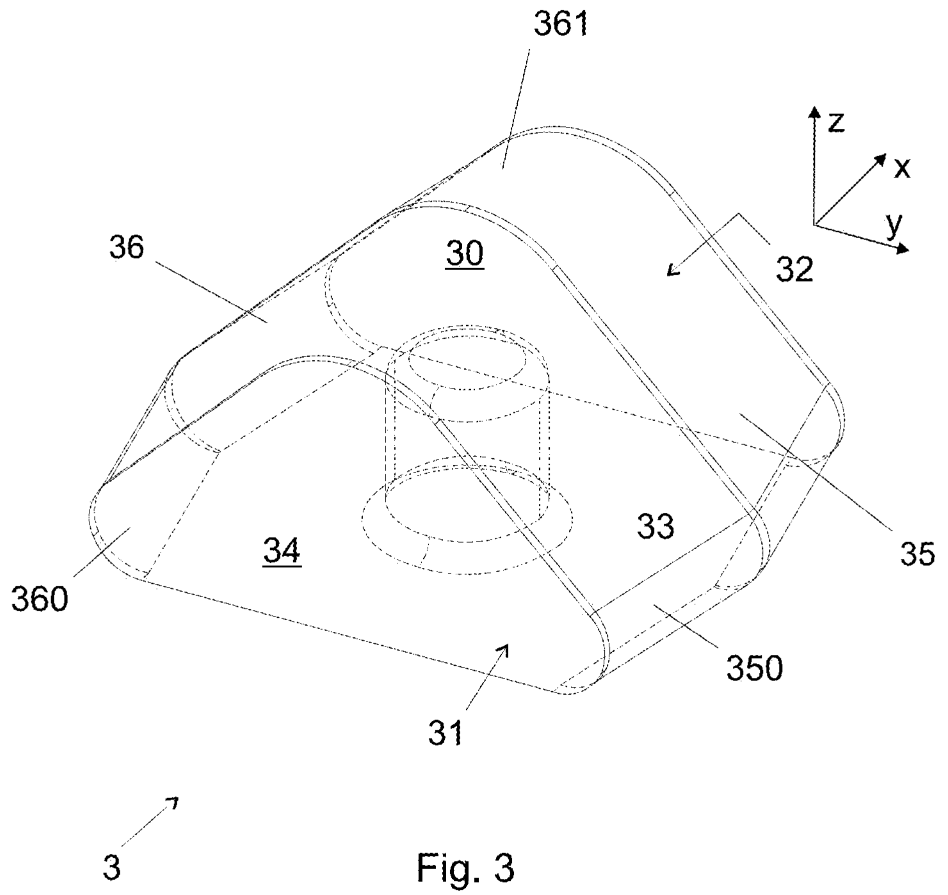

FIG. 3 illustrates another resonator 3 in which the roof panels 35-36 are connected to the base 34 by curved surfaces of large radius, and connected to each other by a curved surface of large radius. In addition, the cross-sectional area of the resonator increases progressively from each longitudinal end of the resonator toward its longitudinal midpoint; thus, in this example, the height of the resonator is maximum at the center of the resonator along the longitudinal x axis. This feature also facilitates additive printing, as the edge 361 is vaulted along the longitudinal axis which reduces the risk of its collapse.

Figure 4:
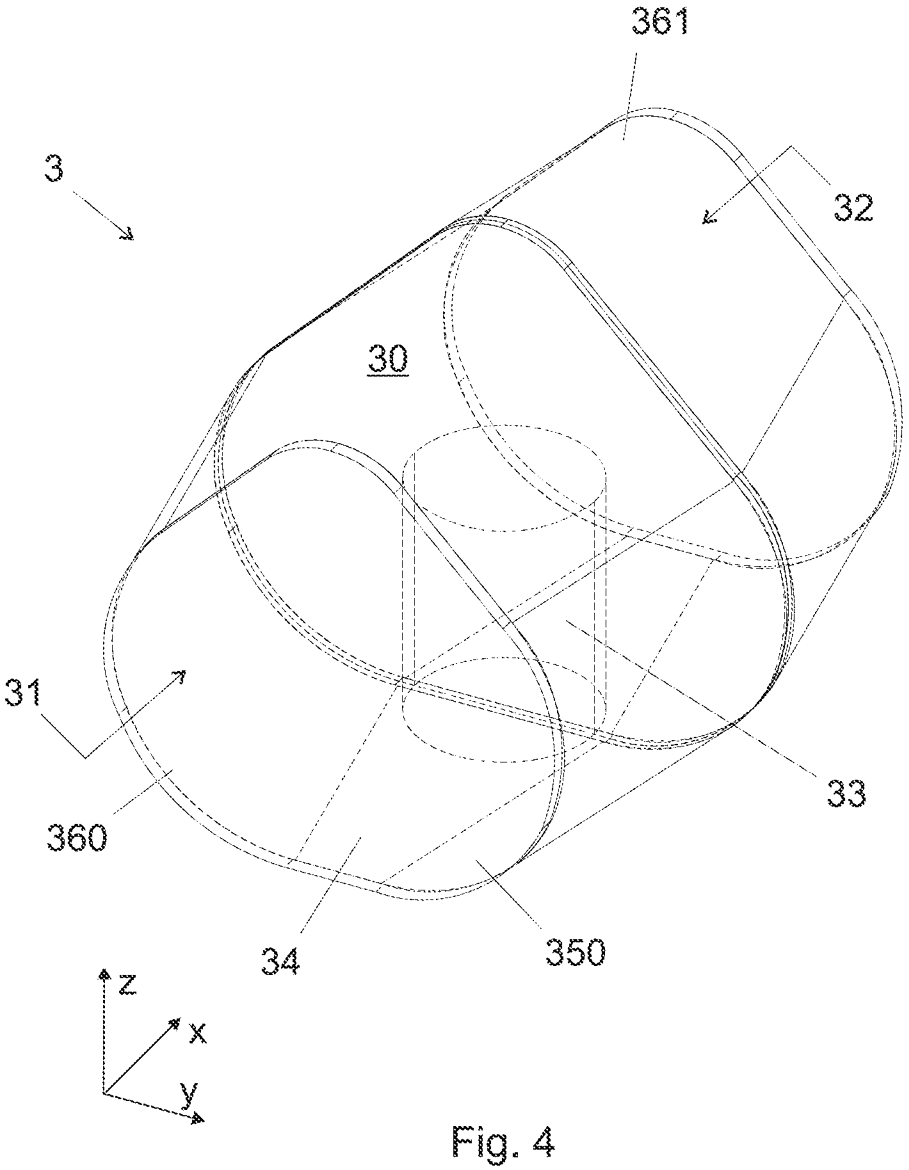
Figure 6:
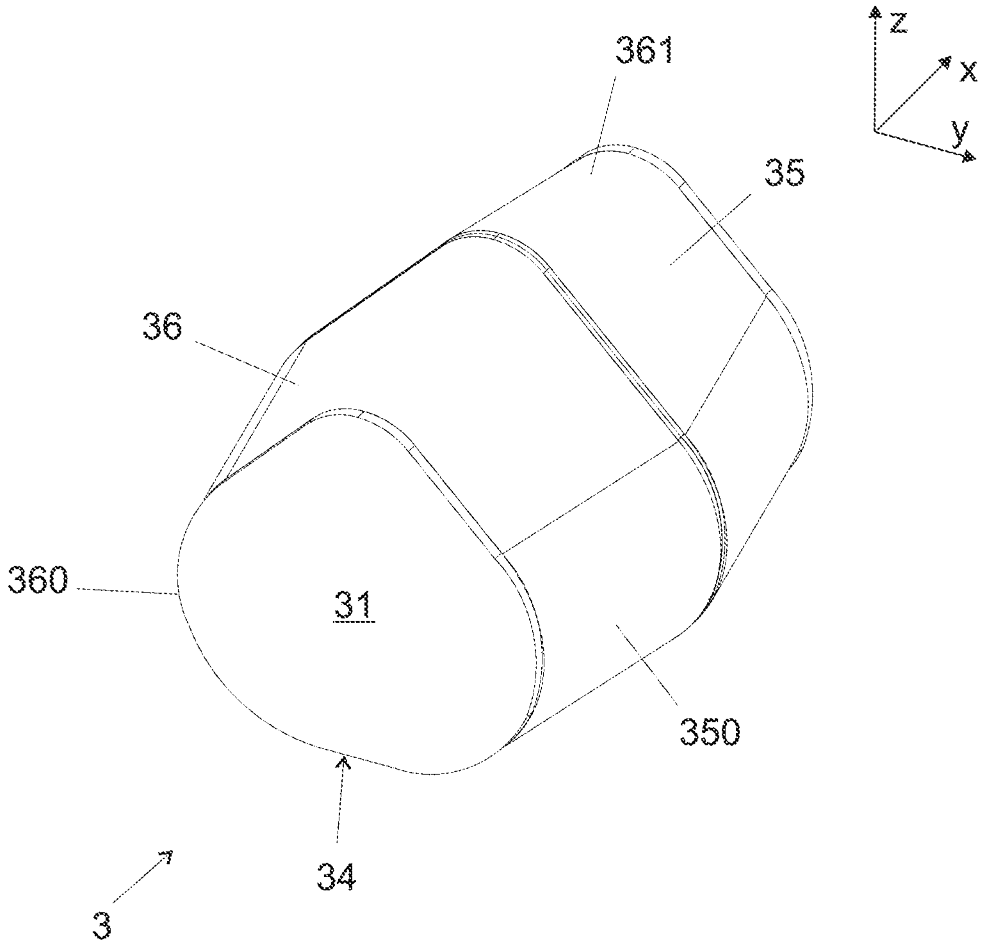

FIGS. 4 and 6 illustrate a cross-sectional and planar view of a resonator 3 comparable to that of FIG. 3 but in which the width of the planar base 34 widens progressively from each longitudinal end of the resonator toward its longitudinal middle; in this example, the base 34 thus has a maximum width at the center of the resonator along the longitudinal x axis. The cross-section of the cavity (disregarding the post 33 and the possible tuning screw above the post) is maximum at the center of the resonator along the longitudinal axis x.

Figure 5A:
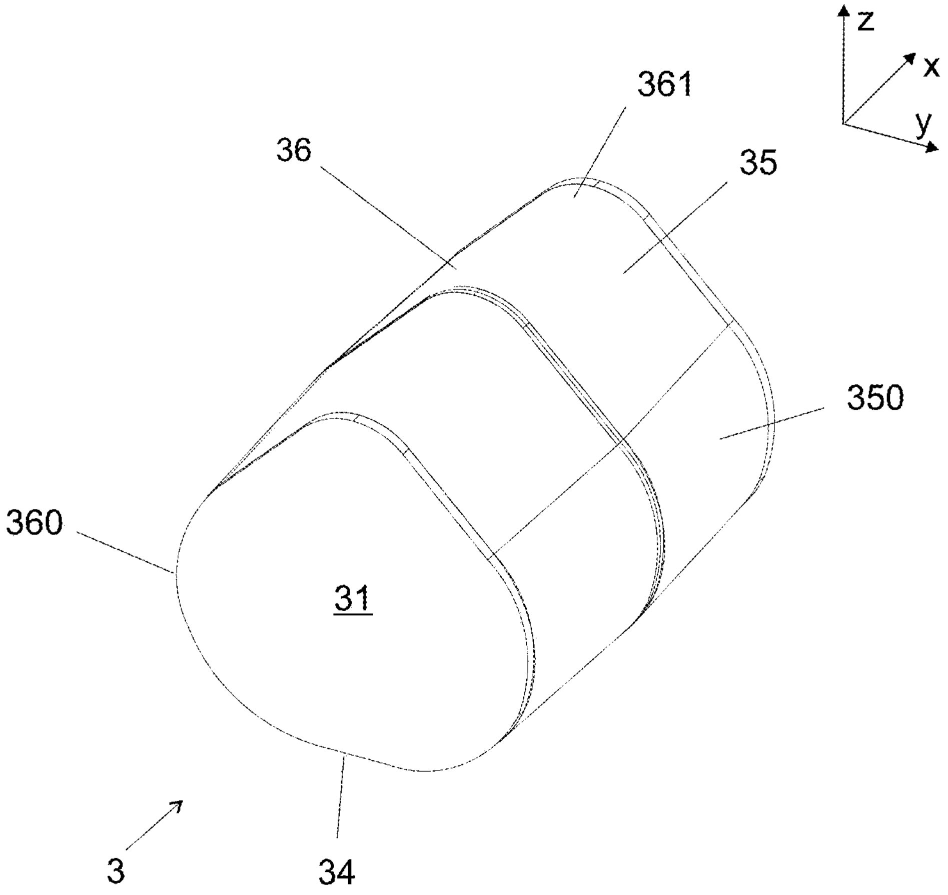
Figure 5B:
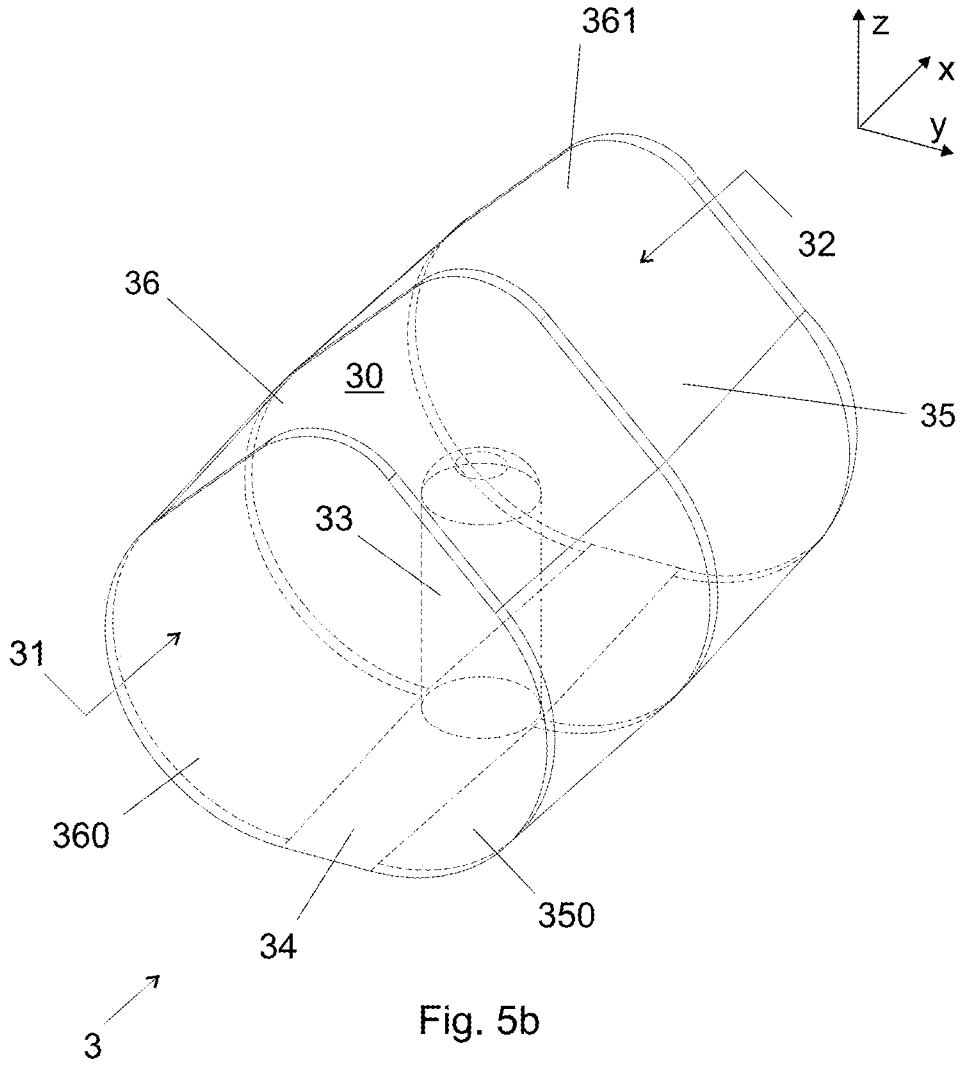

FIGS. 5*a* and 5*b* illustrate a resonator 3 in which the roof panels 35-36 are connected to the base 34 by curved surfaces 350, 360 of substantial radius, and between them by a curved surface 361 of substantial radius. The width of the base 34 and the height of the resonator is constant along the longitudinal x axis.

Figure 7A:
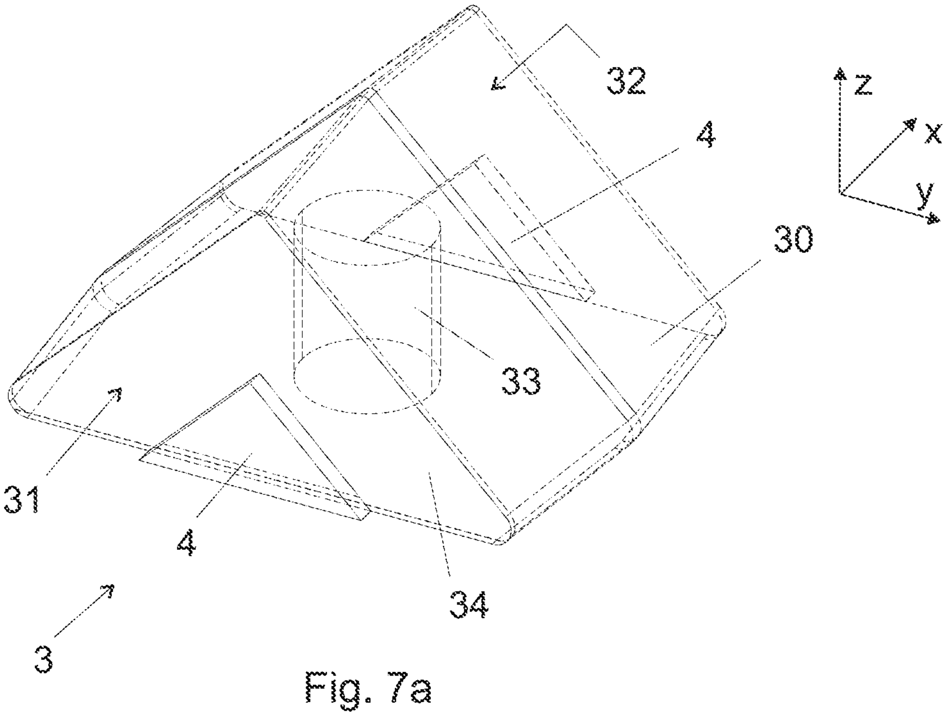
FIGS. 7*a* and 7*b* illustrate two perspective views of an example of a resonator that can be implemented in a metal combline waveguide filter, the iris being provided with two longitudinal irises with a triangular cross-section for connecting it to two other resonators of a waveguide filter.
Figure 7B:
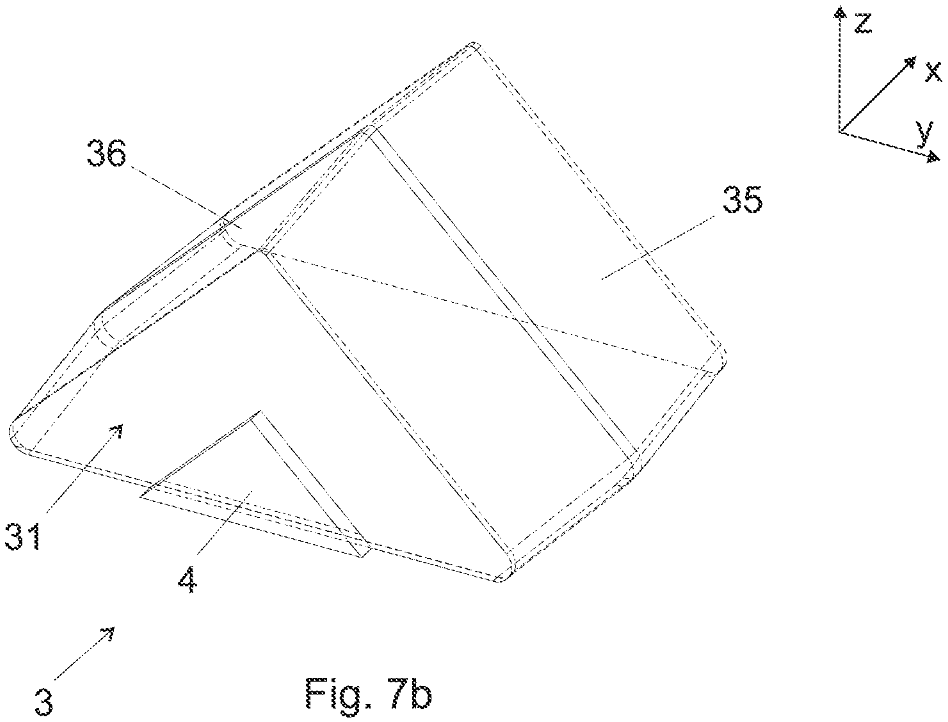

FIGS. 7*a* and 7*b* illustrate perspective views of an example resonator 3 of a metal combline waveguide filter. The cross-section of the cavity 30 is triangular. The vertical walls 31 and 32 are each provided with an iris 4 to connect this cavity to an adjacent cavity in the longitudinal x direction. In this example, both irises 4 are triangular in cross-section and form an opening in the corresponding wall. As will be seen other iris cross sections can be provided. In one embodiment, as will be seen, the cavity 30 may be connected to the cavity of other resonators by irises provided on the side edges, i.e., on the edges of the roof 35-36. Such longitudinal or transverse irises, of any cross-section, may also be provided with the resonators of the preceding figures.

Figure 8A:
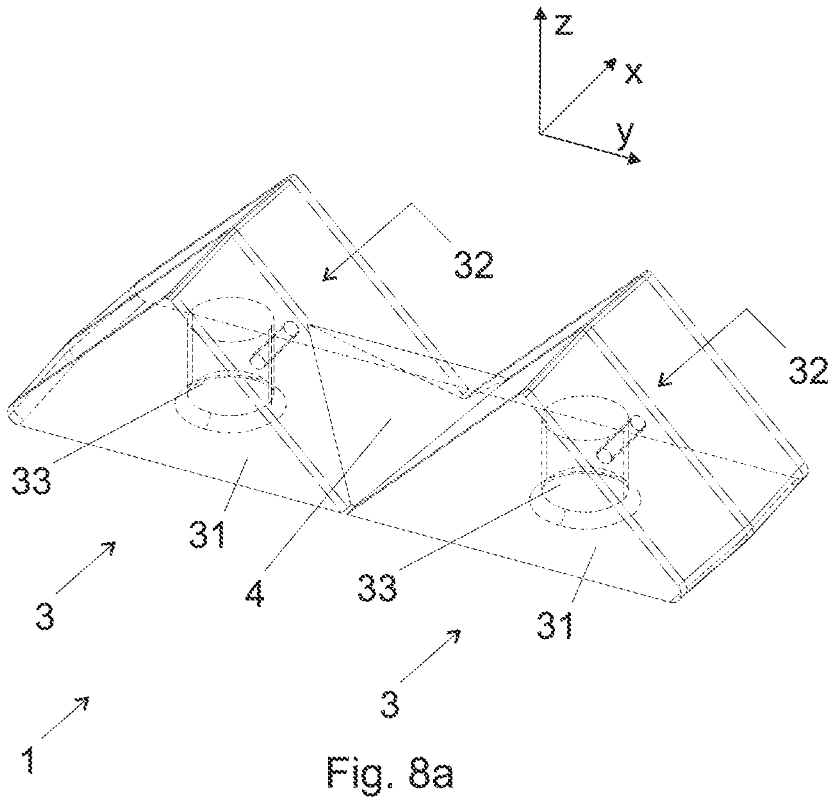
FIGS. 8*a* and 8*b* illustrate different perspective views of two resonators of a combline waveguide filter connected by an example of a transverse iris.
Figure 8B:
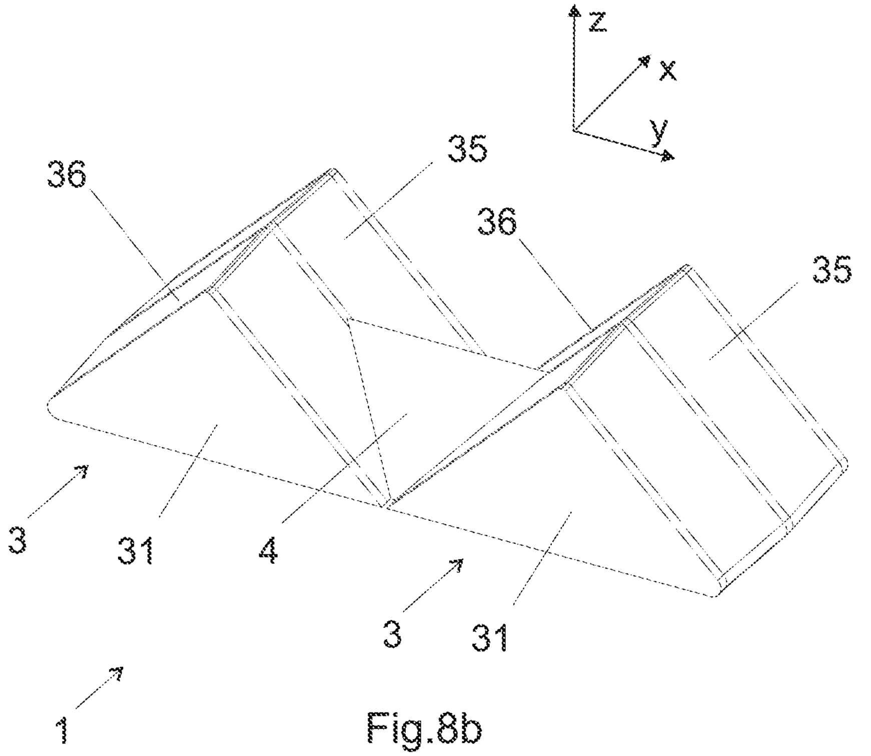

FIGS. 8*a* and 8*b* illustrate two resonators 3 adjacent in the transverse axis y and connected to each other by a transverse iris 4, between the roof panel 36 of one resonator and the roof panel 36 of the other resonator. The iris 4 has in this example a volume forming a polyhedron with 4 triangular faces, the two faces parallel to the roof panels 35, 36 being hollow in order to form an opening between the two cavities.

The dimensions of the iris determine the properties of the filter. Increasing the height of the iris improves the coupling between cavities, but also increases the bandwidth of the filter.

Figure 9:
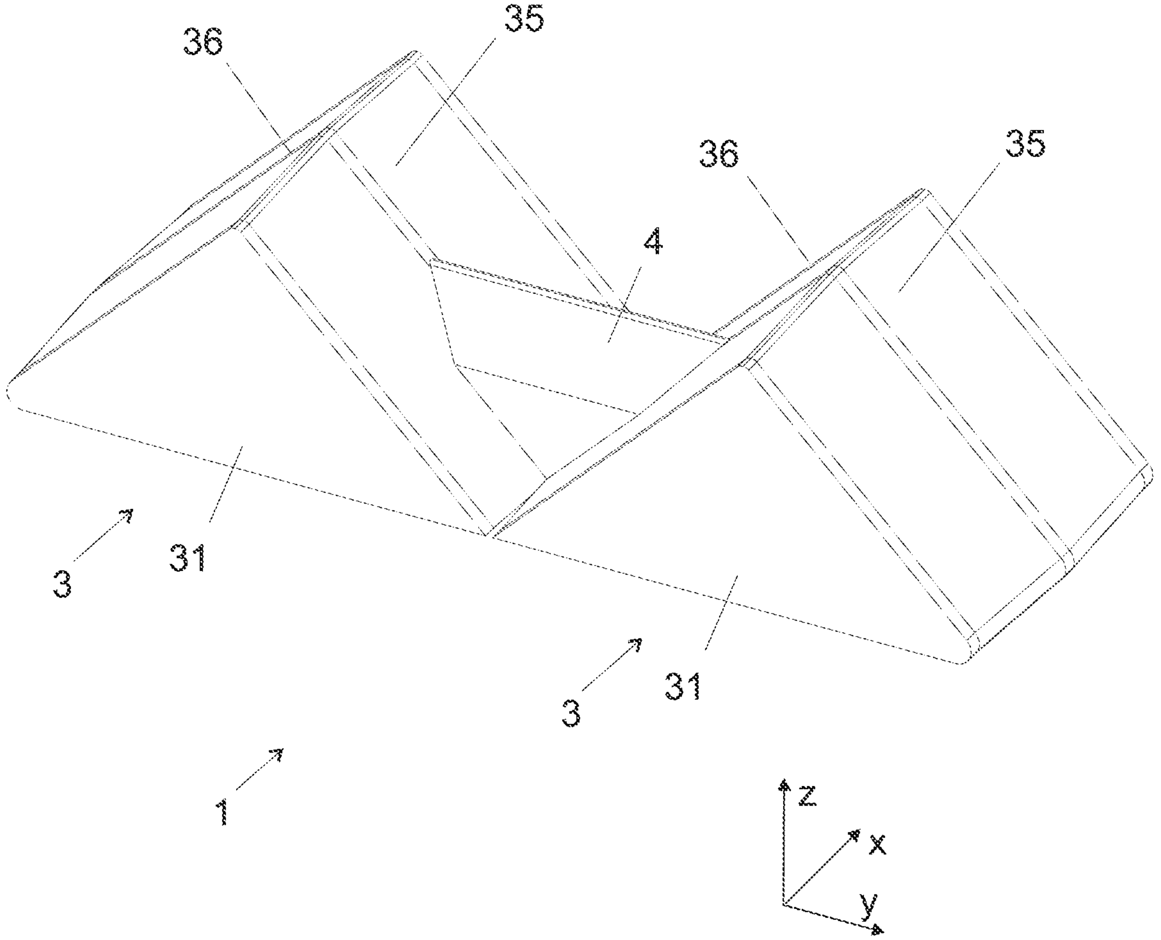
FIG. 9 illustrates a perspective view of two resonators of a combline waveguide filter connected by an example of a transverse iris.

FIG. 9 illustrates two resonators 3 adjacent in the transverse axis y and connected to each other by a transverse iris 4, between the roof panel 36 of one resonator and the roof panel 36 of the other resonator. The iris 4 has in this example a volume forming a polyhedron with two pentagonal faces parallel to the roof panels 35, 36, two triangular faces and two trapezoidal faces. The two pentagonal faces are hollow in order to form an opening between the two cavities.

Figure 10:
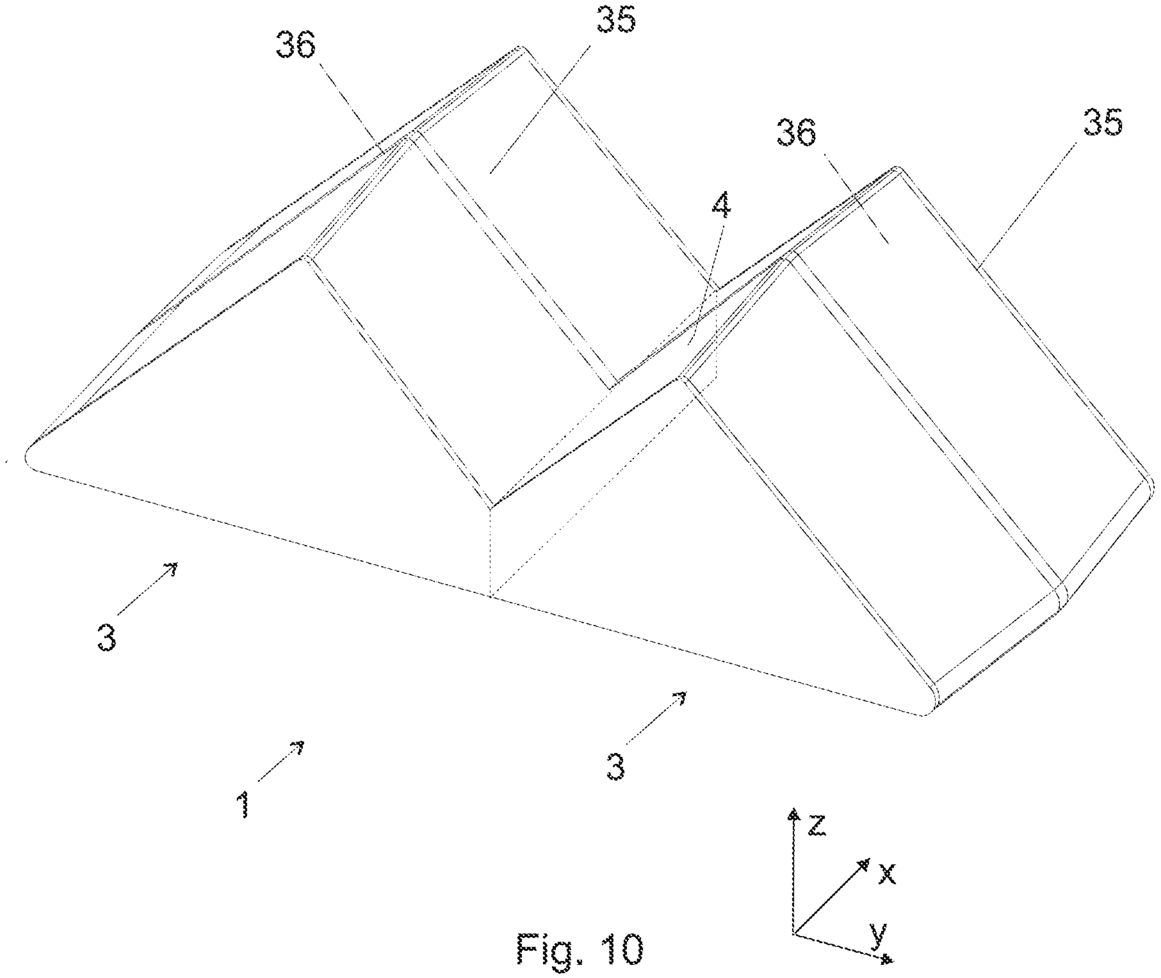
FIG. 10 illustrates a perspective view of two resonators of a combline waveguide filter connected by an example of a transverse iris.

FIG. 10 illustrates two resonators 3 adjacent in the transverse axis y and connected to each other by a transverse iris 4, between the roof panel 36 of one resonator and the roof panel 36 of the other resonator. The iris 4 is in this case constituted by the intersection of the two roof panels 35 of one resonator and the roof panel 36 of the adjacent resonator; its cross-section is thus rectangular, and its upper edge is constituted by the edge at the intersection of the two roof panels. This edge is advantageously non-rectilinear, the roofs of each cavity being higher at the longitudinal center of the cavity, which facilitates the additive impression of the edge thus vaulted.

Figure 11A:
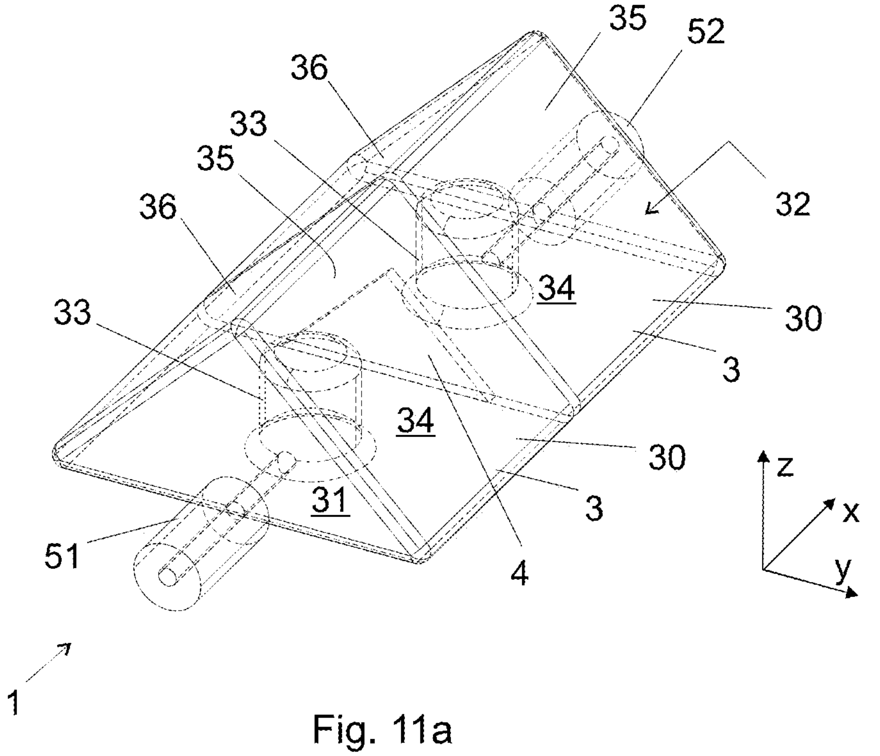
FIGS. 11*a* and 11*b* illustrate different perspective views of two resonators of a combline waveguide filter connected by a longitudinal iris with triangular section.
Figure 11B:
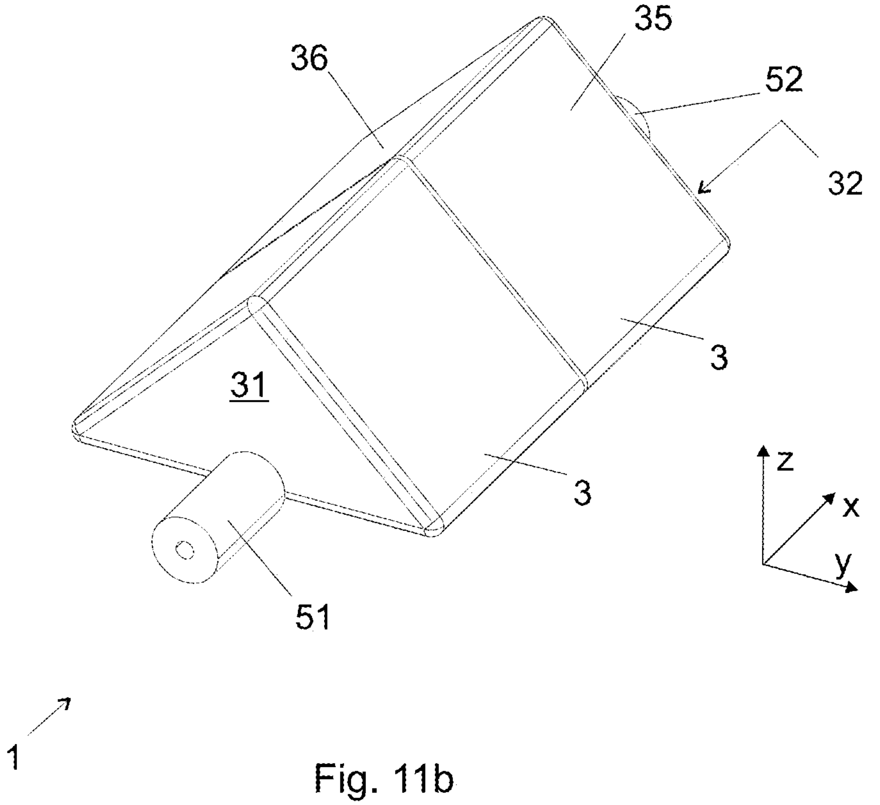

FIGS. 11*a* and 11*b* illustrate two resonators 3 adjacent in the longitudinal axis x and connected to each other by a longitudinal iris 4, between the vertical wall 31 of one resonator and the wall 32 of the adjacent resonator. The iris 4 in this example has a triangular cross-section in the y-z transverse plane.

Figure 12A:
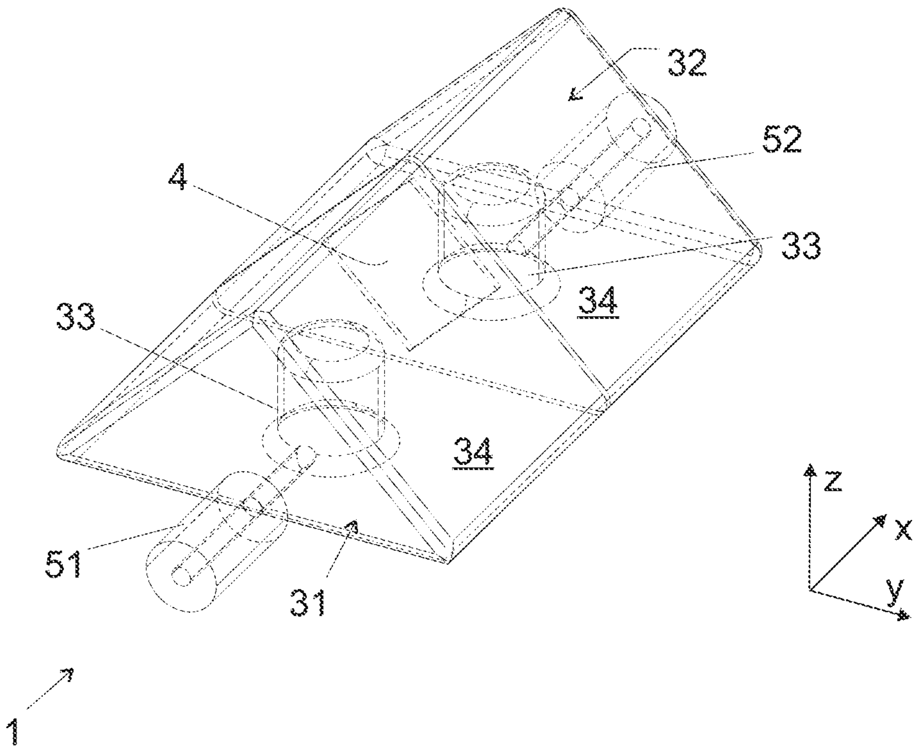
FIGS. 12*a* and 12*b* illustrate different perspective views of two resonators of a combline waveguide filter connected by a longitudinal iris with quadrilateral section.
Figure 12B:
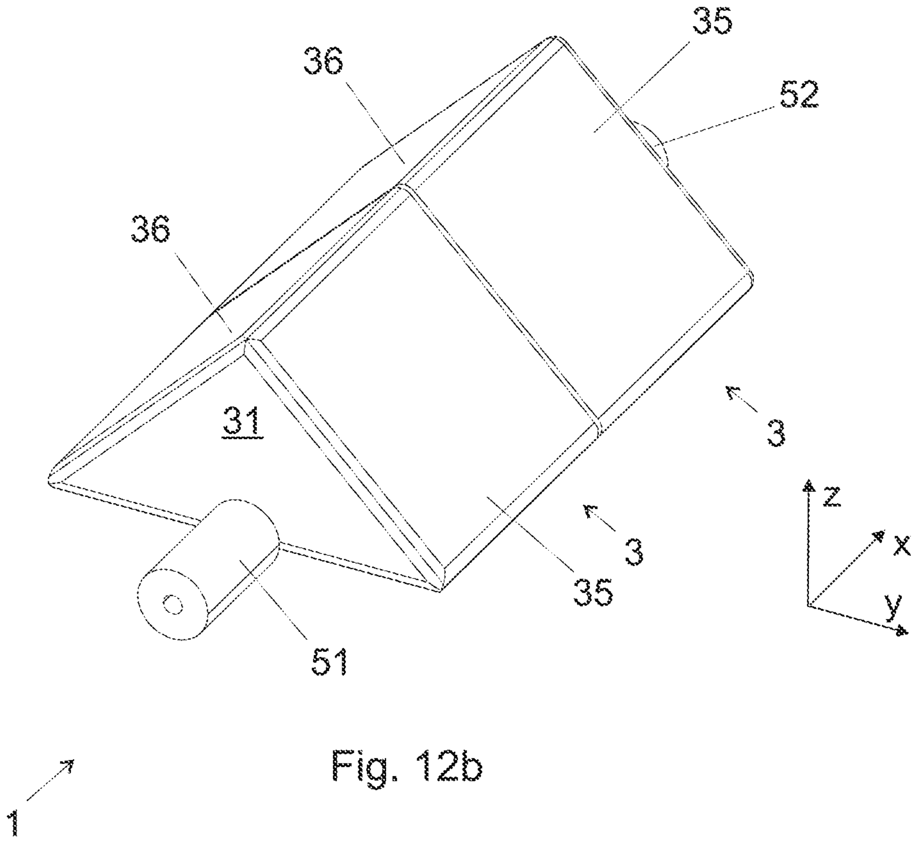

FIGS. 12*a* and 12*b* illustrate two resonators 3 adjacent in the longitudinal axis x and connected to each other by a longitudinal iris 4, between the vertical wall 31 of one resonator and the wall 32 of the adjacent resonator. The iris 4 in this example has a cross-section in the y-z transverse plane in the shape of a quadrilateral, for example a square or diamond.

Figure 13A:
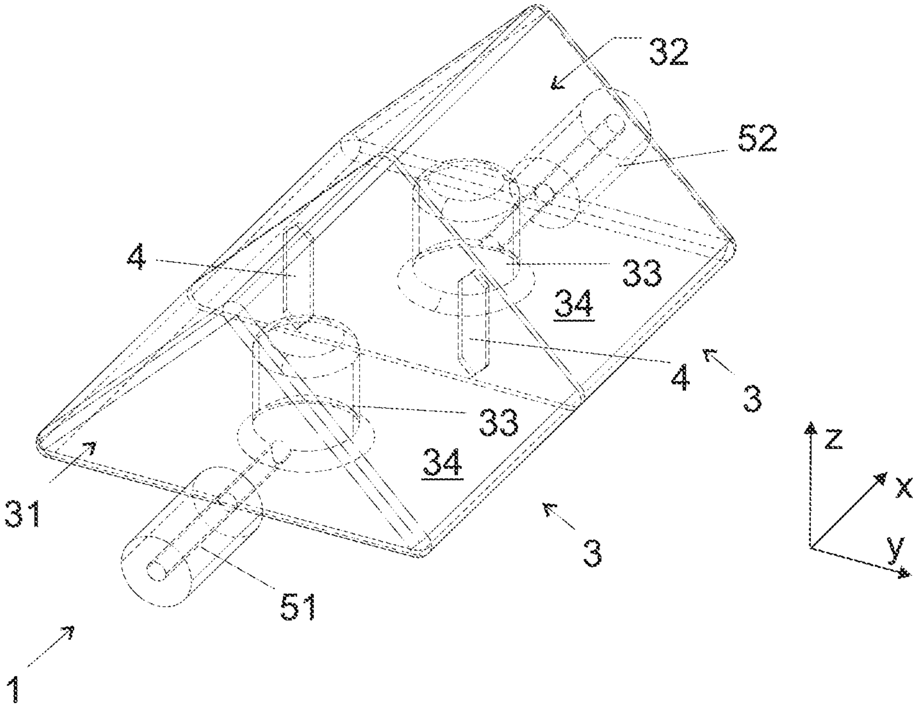
FIGS. 13*a* and 13*b* illustrate different perspective views of two resonators of a combline waveguide filter connected by two longitudinal slot irises.
Figure 13B:
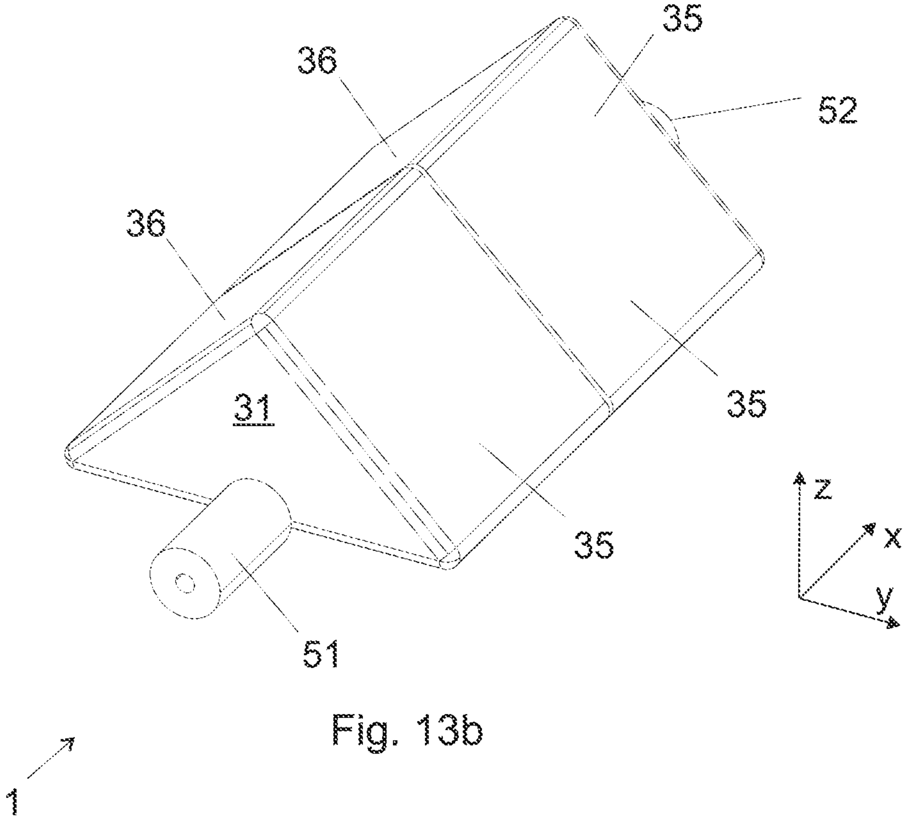

FIGS. 13*a* and 13*b* illustrate two resonators 3 adjacent in the longitudinal axis x and connected to each other by two oblong slot shaped irises 4, between the vertical wall 31 of one resonator and the wall 32 of the adjacent resonator.

Figure 14A:
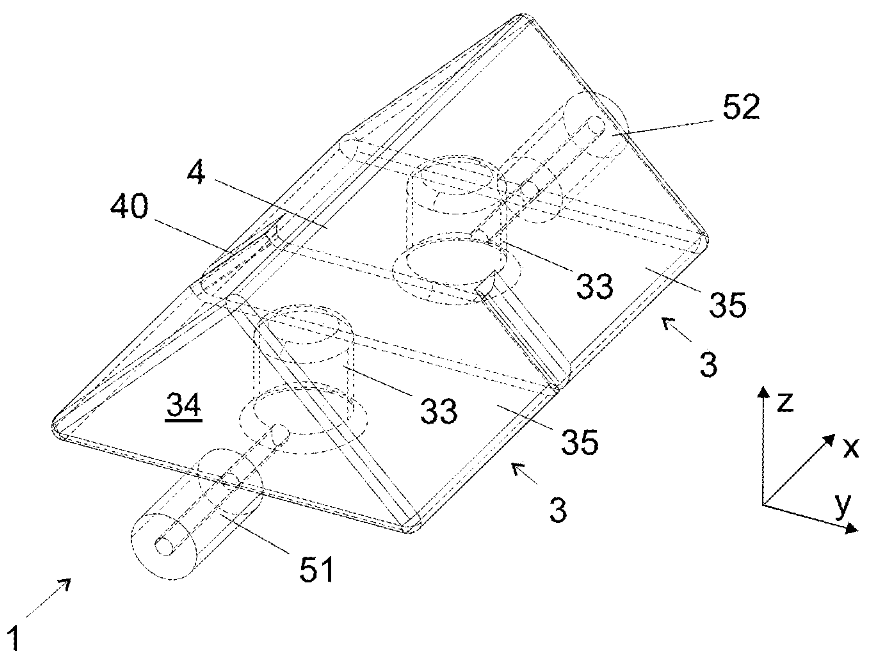
FIGS. 14*a* and 14*b* illustrate different perspective views of two resonators of a combline waveguide filter connected by a longitudinal iris with triangular section, defined by an obstacle.
Figure 14B:
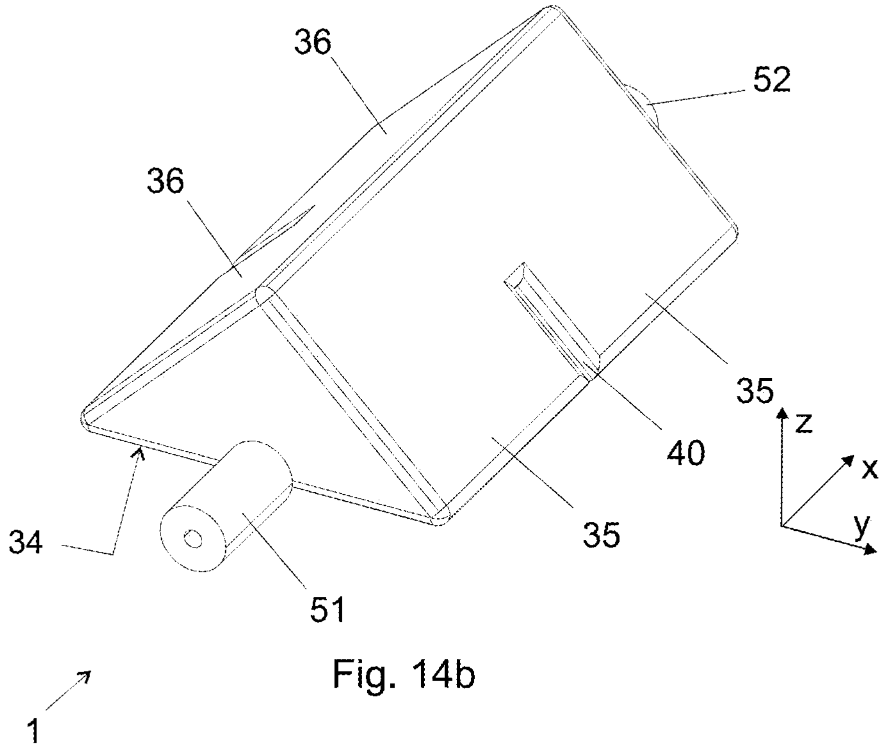

FIGS. 14*a* and 14*b* illustrate two resonators 3 adjacent in the longitudinal axis x and connected to each other by a longitudinal iris 4, between the vertical wall 31 of one resonator and the wall 32 of the adjacent resonator. The iris 4 in this example has a cross-section in the y-z transverse plane in the shape of a triangle in the vertex of the intersection between the two cavities, this triangle being defined by an obstacle 40 between the two cavities, here a transverse ridge of trapezoidal cross-section extending from the plane of the base 34 of the two resonators 3.

Figure 15A:
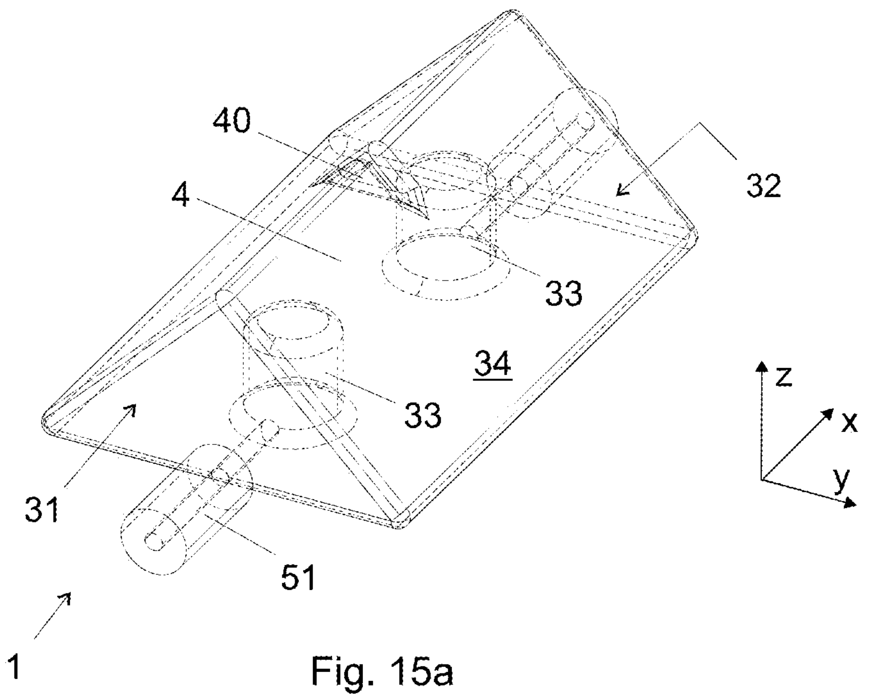
FIGS. 15*a* and 15*b* illustrate different perspective views of two resonators of a combline waveguide filter connected by a longitudinal iris with trapezoidal section, defined by an obstacle.
Figure 15B:
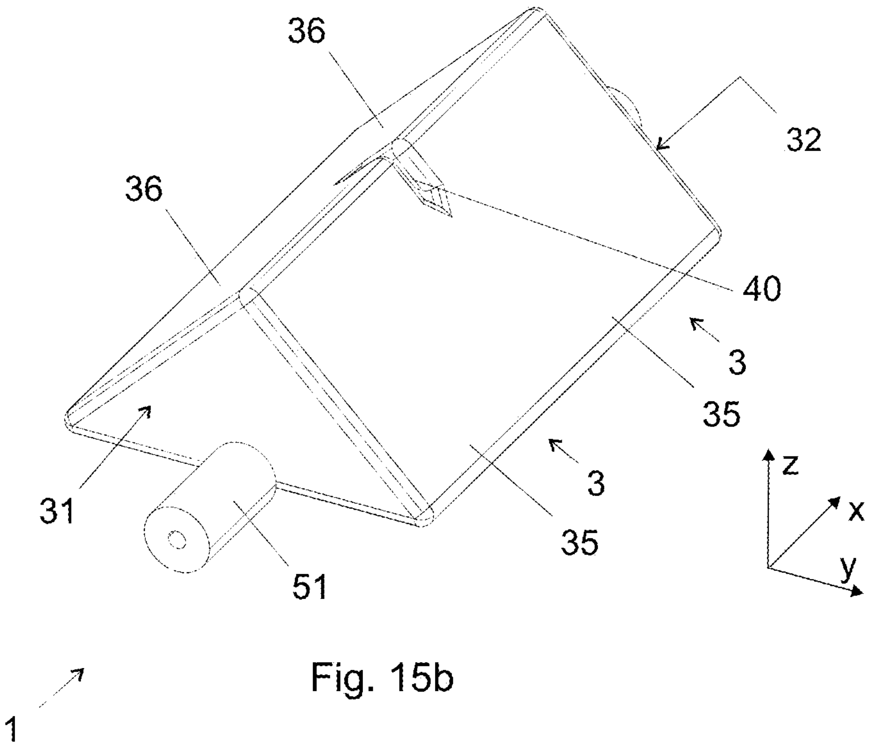

FIGS. 15*a* and 15*b* illustrate two resonators 3 adjacent in the longitudinal axis x and connected to each other by a longitudinal iris 4, between the vertical wall 31 of one resonator and the wall 32 of the adjacent resonator. The iris 4 in this example has a cross-section in the y-z transverse plane in the shape of a trapeze extending from the base of the intersection between the two cavities, this trapeze being defined by an obstacle 40 between the two cavities, in this case a transverse ridge of triangular cross-section extending from the roof edge of the two resonators 3.

Figure 16A:
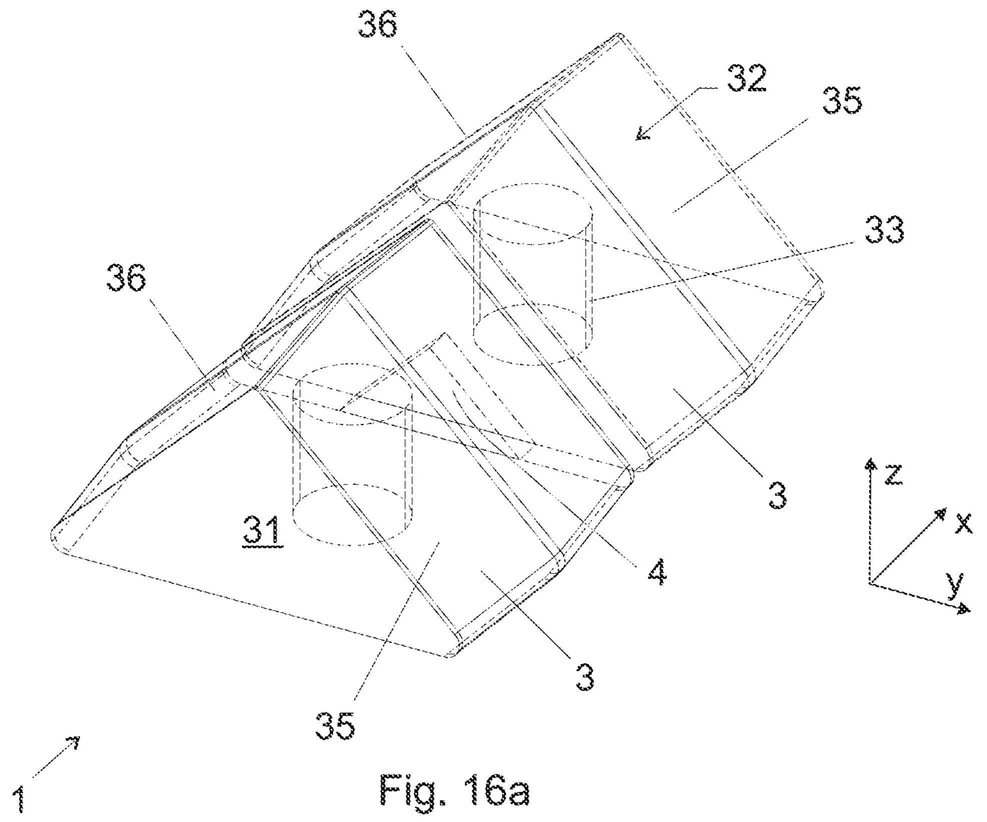
FIGS. 16*a* and 16*b* illustrate different perspective views of two resonators of a combline waveguide filter connected by a longitudinal iris with triangular section.
Figure 16B:
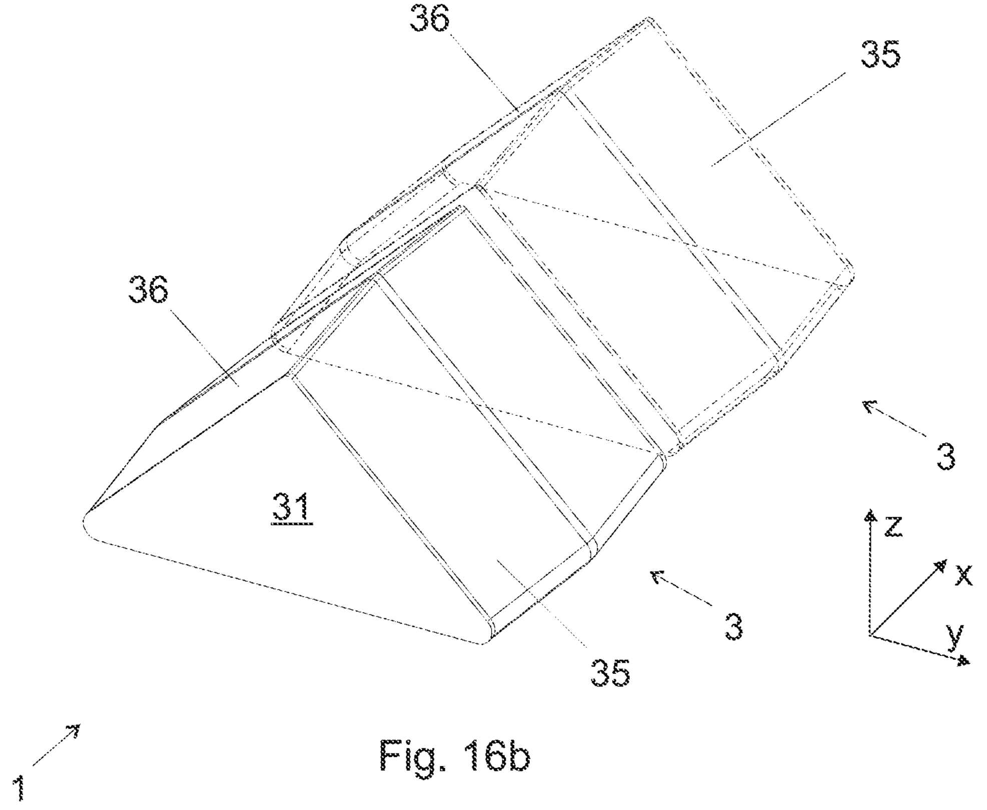

FIGS. 16*a* and 16*b* illustrate two resonators 3 of different shape and/or cross-section, adjacent in the longitudinal axis x and connected to each other by a longitudinal iris 4, between the vertical wall 31 of one resonator and the wall 32 of the adjacent resonator. The iris 4 in this example has a triangular cross-section in the y-z transverse plane.

Figure 17A:
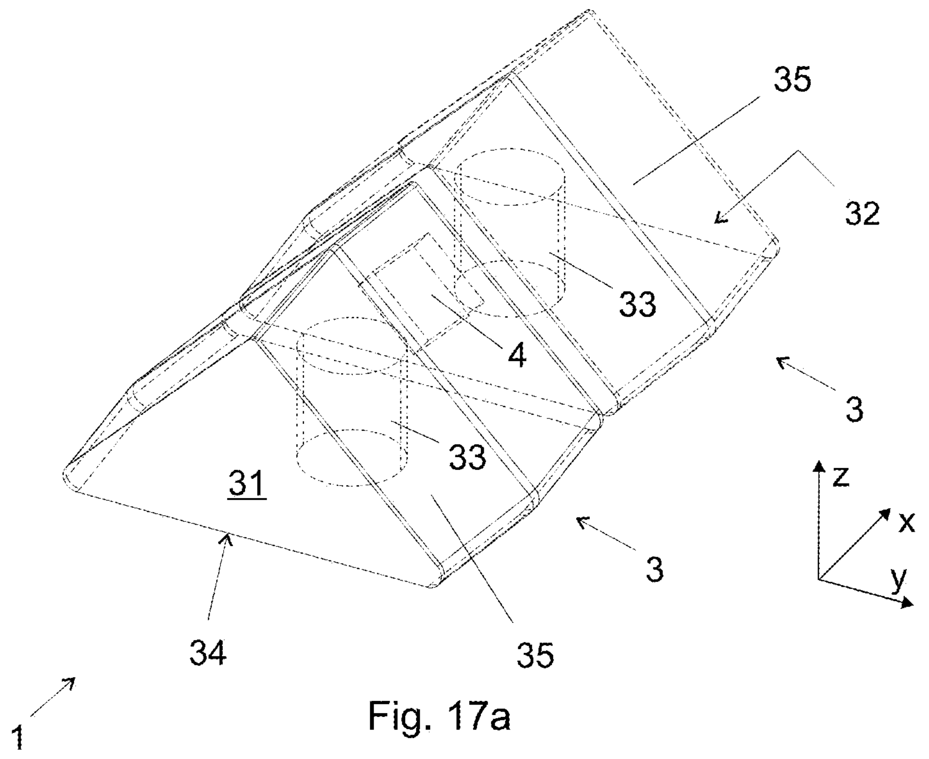
FIGS. 17*a* and 17*b* illustrate different perspective views of two resonators of a combline waveguide filter connected by a longitudinal iris with quadrilateral section.
Figure 17B:
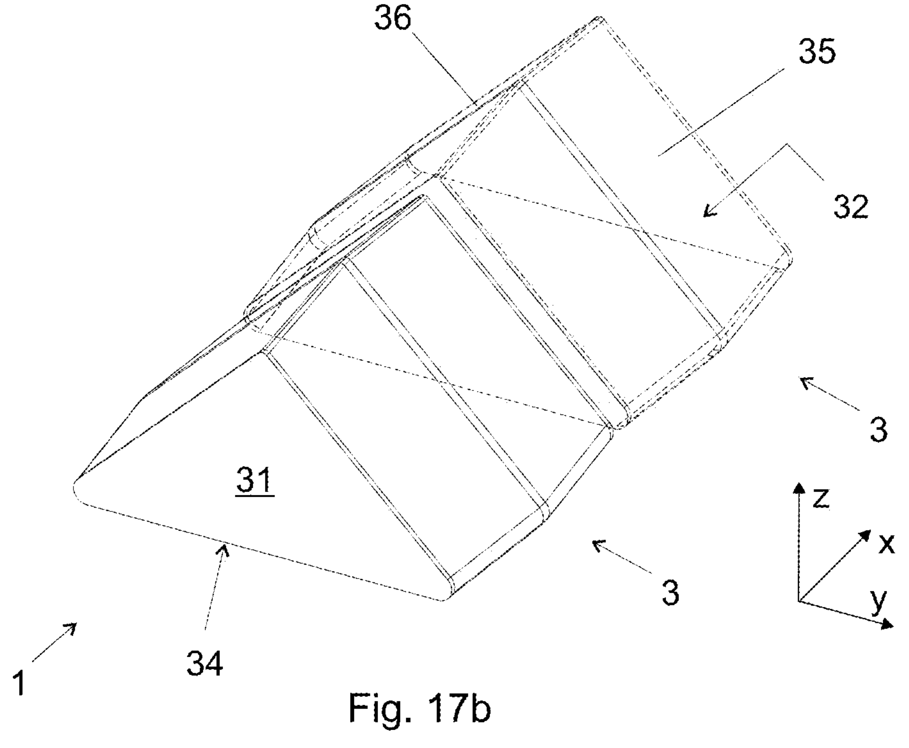

FIGS. 17*a* and 17*b* illustrate two resonators 3 of different shape and/or cross-section, adjacent in the longitudinal axis x and connected to each other by a longitudinal iris 4, between the vertical wall 31 of one resonator and the wall 32 of the adjacent resonator. The iris 4 has in this example a cross-section in the transverse plane y-z in the shape of a quadrilateral.

Figure 18A:
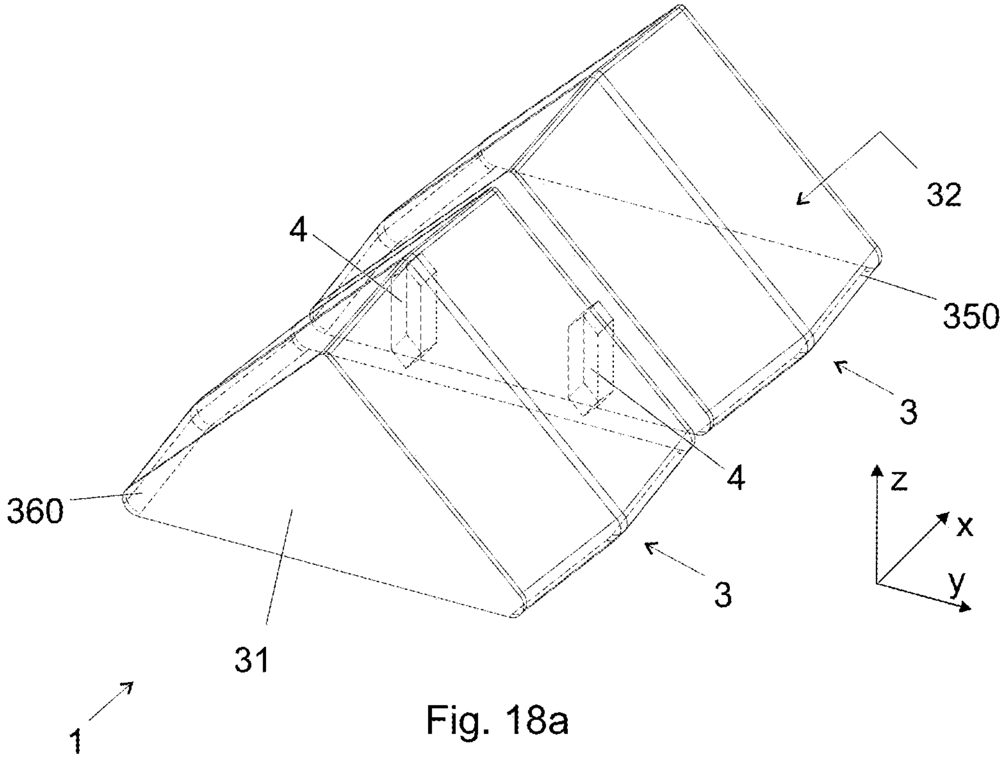
FIGS. 18*a* and 18*b* illustrate different perspective views of two resonators of a combline waveguide filter connected by two longitudinal slot irises.
Figure 18B:
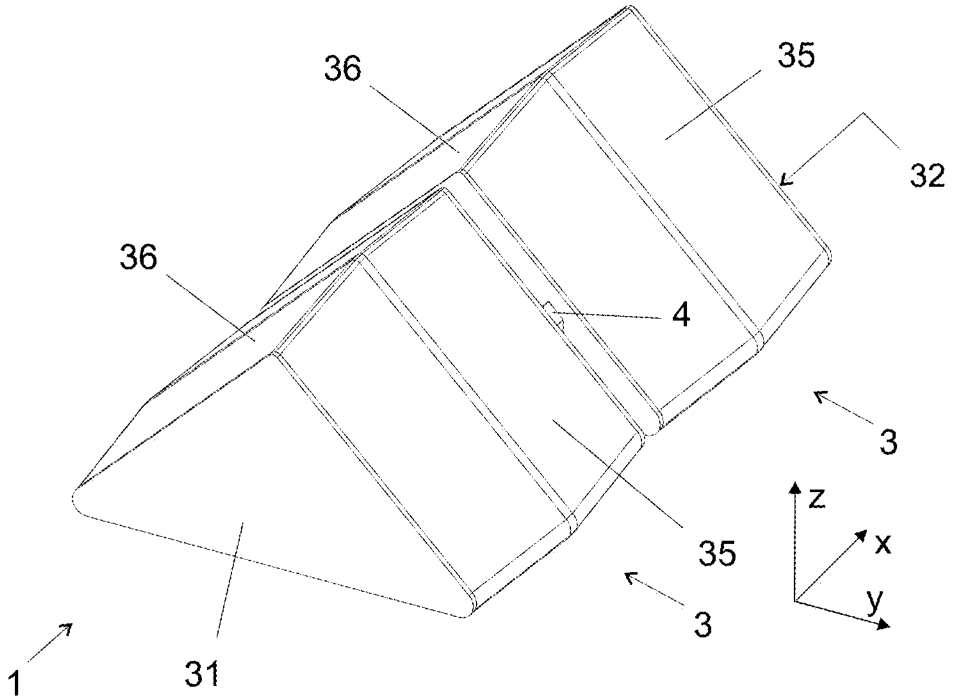

FIGS. 18*a* and 18*b* illustrate two resonators 3 of different shape and/or cross-section, adjacent in the longitudinal axis x and connected to each other by two longitudinal irises 4 forming two elongated slots between the vertical wall 31 of one resonator and the wall 32 of the adjacent resonator.

The filters described above include two adjacent resonators. However, a comb waveguide filter may comprise more than two resonators, for example at least four resonators, for example eight or more resonators. These resonators may be juxtaposed in the longitudinal x direction and/or in the transverse y direction in order to make the best use of the available volume and to achieve a compact combline filter.

Figure 19A:
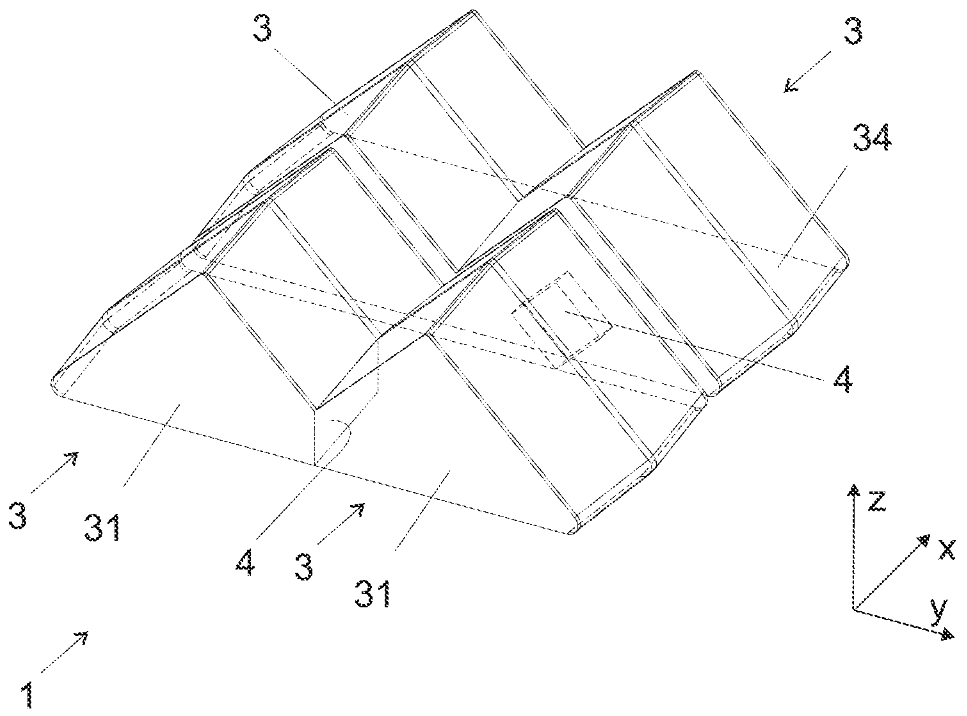
FIGS. 19*a* to 19*c* illustrate different views of a slot waveguide filter, comprising two rows of two resonators each, the two rows being connected to each other by a longitudinal iris with quadrilateral section.
Figure 19B:
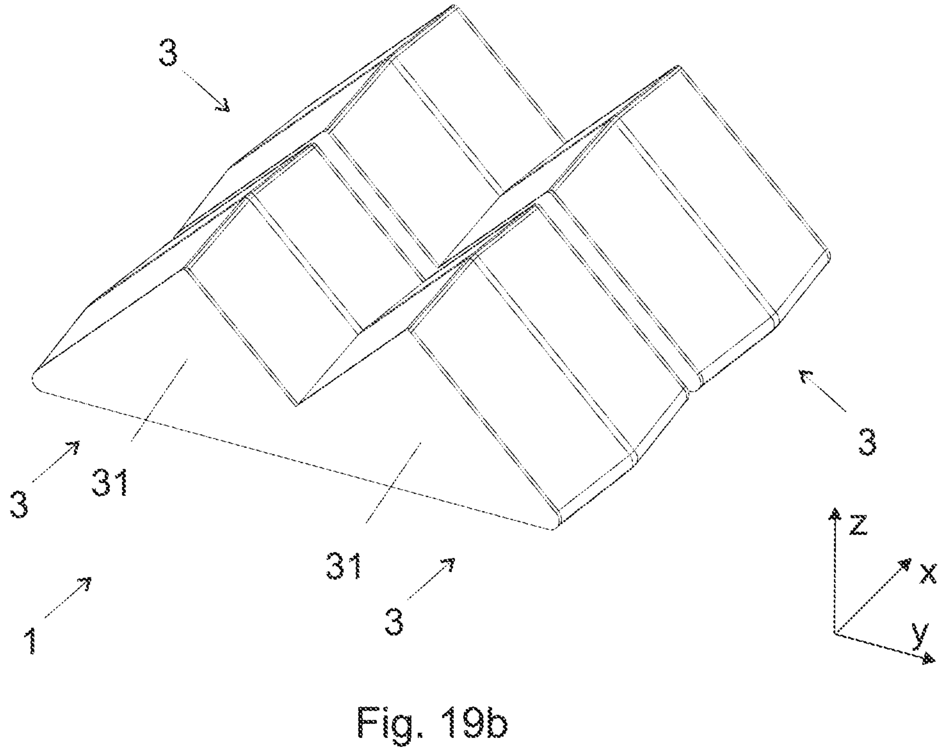
Figure 19C:
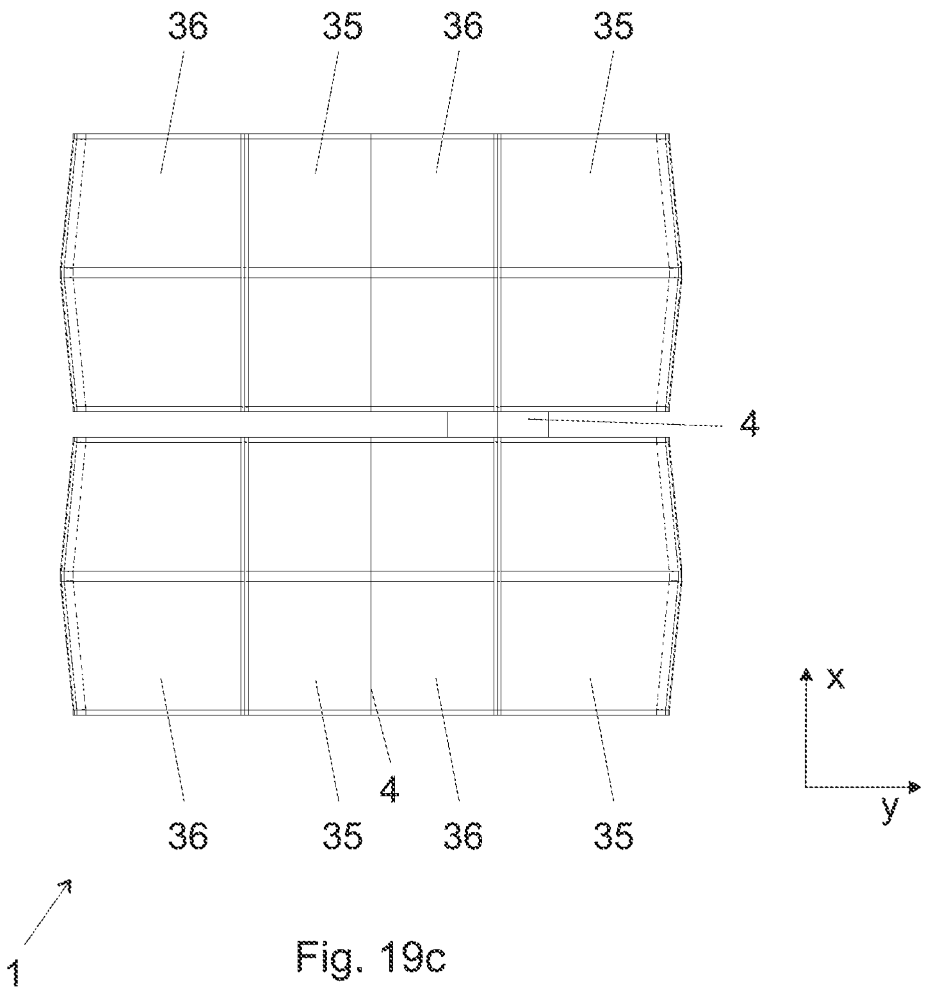

FIGS. 19*a* to 19*c* illustrate four resonators 3 arranged in two rows of two resonators each. The two resonators in each row are connected to each other by transverse irises 4, here irises of rectangular cross section. The two rows are connected to each other by a longitudinal iris, here an iris of square or rectangular cross-section 4.

Other types of transverse irises may be provided between resonators in the same row. Other longitudinal irises may be provided between different rows.

It is also possible to provide multiple irises between two adjacent rows of a filter 1.

It is possible to provide longitudinal irises of different cross-sections within the same filter.

Figure 20A:
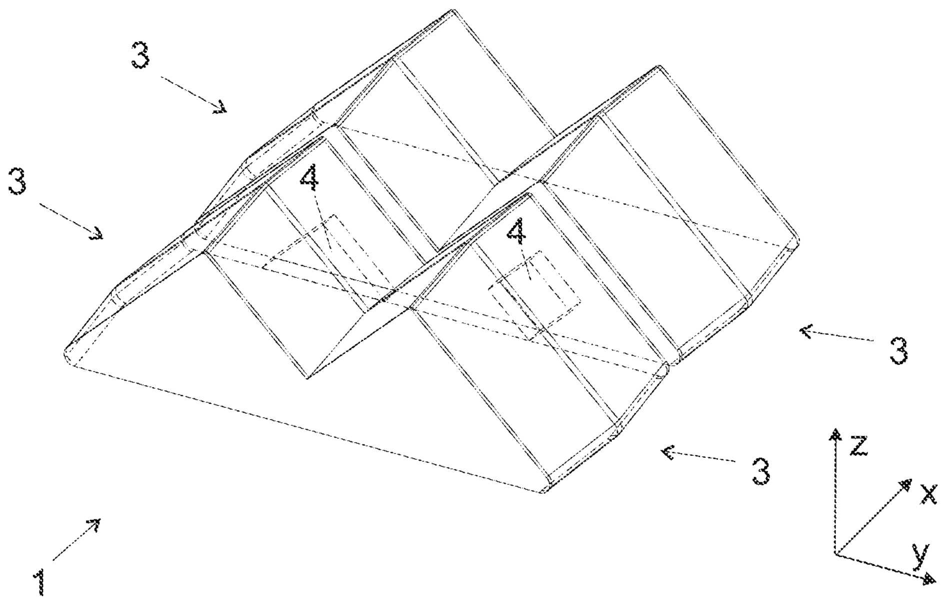
FIGS. 20*a* to 20*c* illustrate different views of a slot waveguide filter, having two rows of two resonators each, the two rows being connected to each other by a longitudinal iris with quadrilateral section and by a longitudinal iris with triangular section.
Figure 20B:
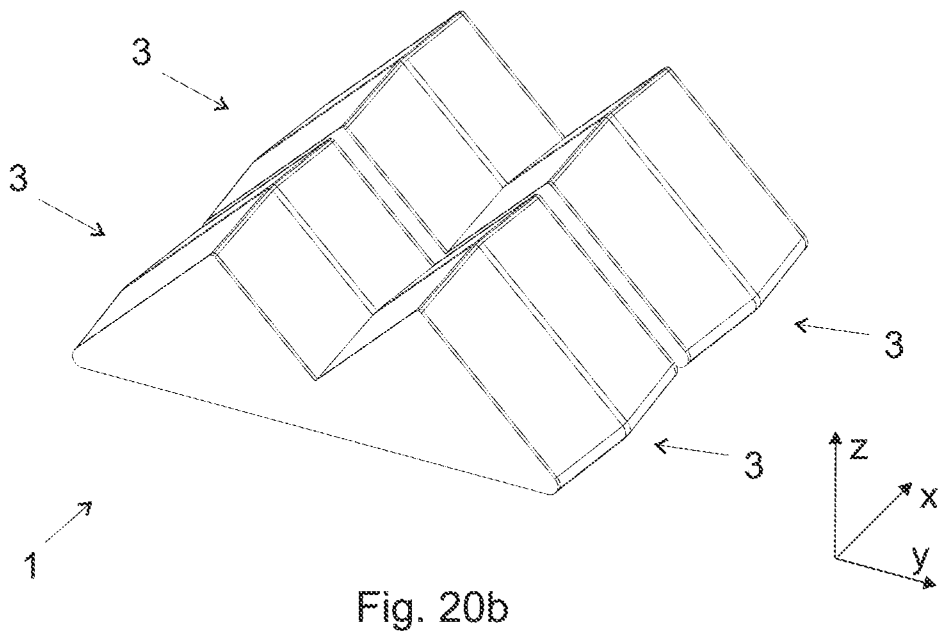
Figure 20C:
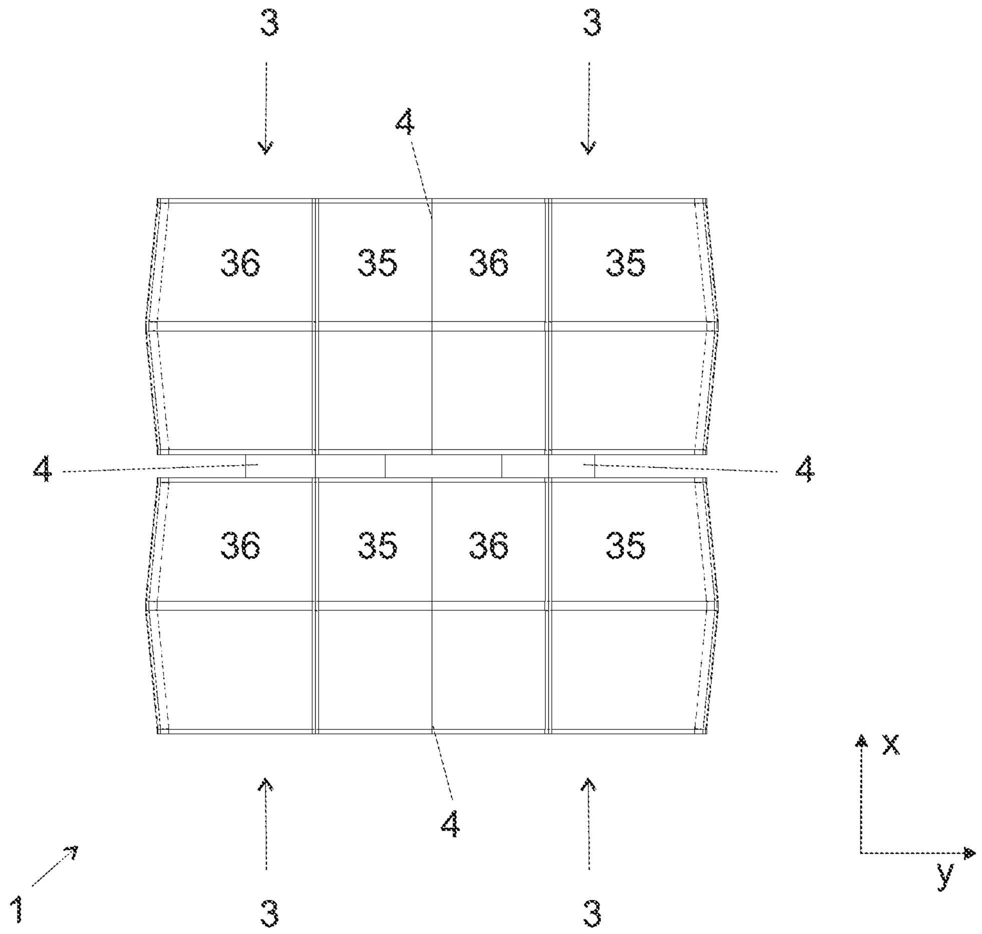

It is possible to provide cross-irises of different sections within the same filter FIGS. 20*a* through 20*c* illustrate four resonators 3 arranged in two rows of two resonators each. The two resonators in each row are connected to each other by transverse irises 4, in this case irises of rectangular cross section. The two rows are connected by a first longitudinal iris of triangular section and by a second iris 4 of quadrilateral section.

Figure 21A:
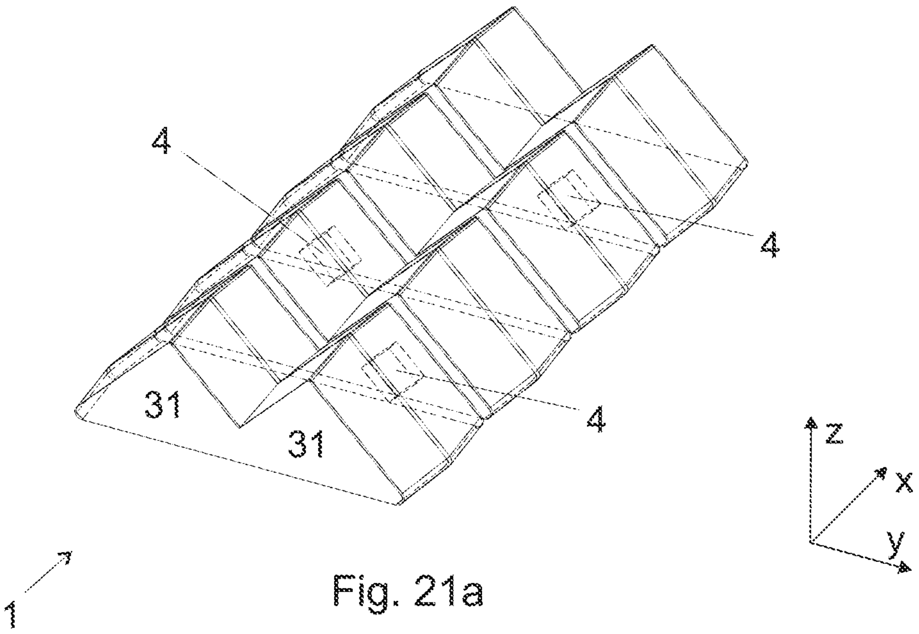
FIGS. 21*a* to 21*b* illustrate different views of a slot waveguide filter, comprising four rows of two resonators each, the adjacent rows being connected to each other by a longitudinal iris with quadrilateral section.
Figure 21B:
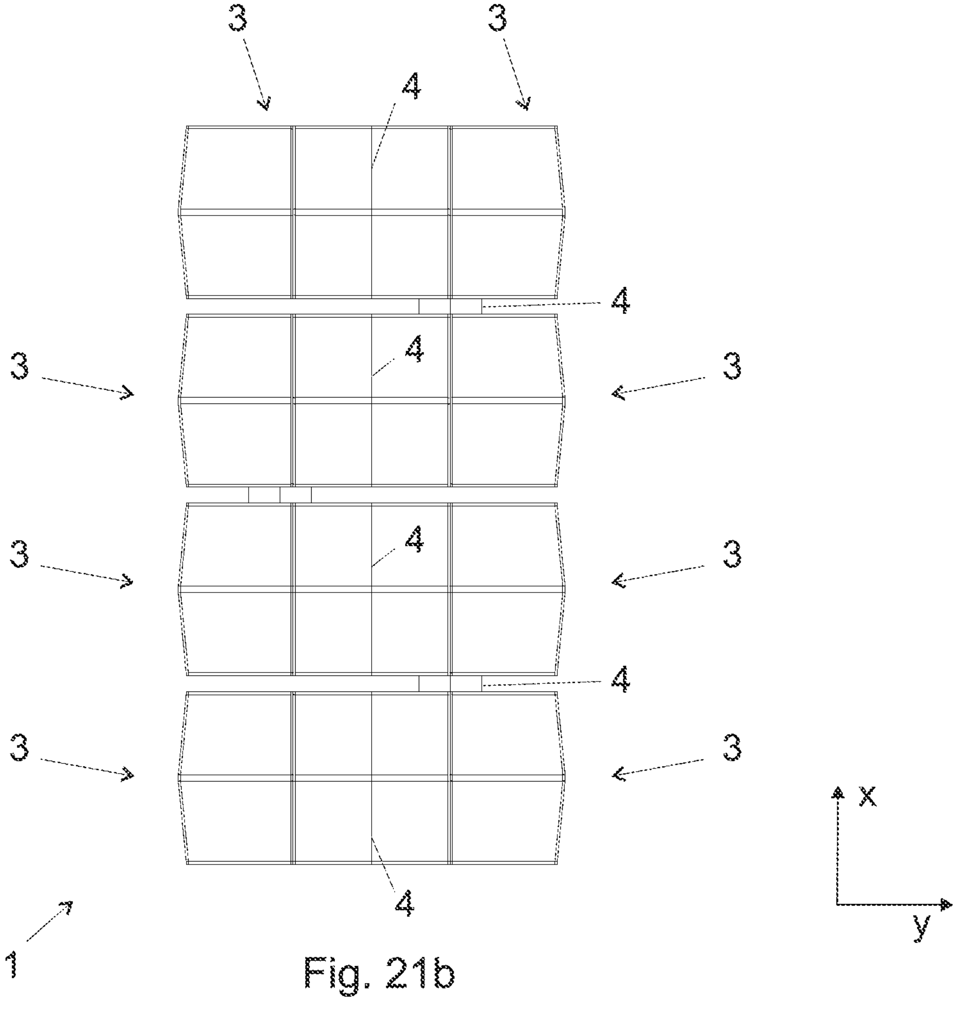

FIGS. 21*a* to 21*c* illustrate a filter comprising eight resonators 3 arranged in four rows of two resonators each. The two resonators in each row are connected to each other by transverse irises 4, in this case irises of rectangular cross-section. The different rows are connected to each other by irises offset along the y axis. In this example, the longitudinal irises 4 all have the same section, here a quadrilateral section. Irises of different cross-section can be provided, for example slot irises or triangular irises. Irises of different shapes can be combined in the same filter.

Figure 22A:
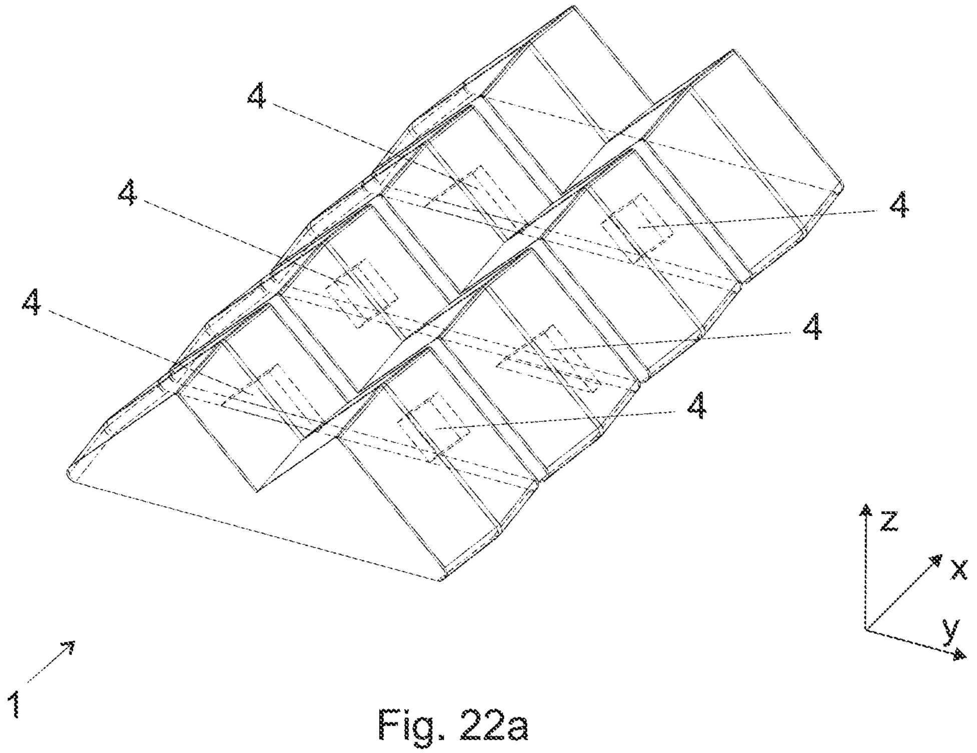
FIGS. 22*a* to 22*c* illustrate different views of a slot waveguide filter, comprising four rows of two resonators each, the adjacent rows being connected to each other by a longitudinal iris with quadrilateral section and by another longitudinal iris with triangular section.
Figure 22B:
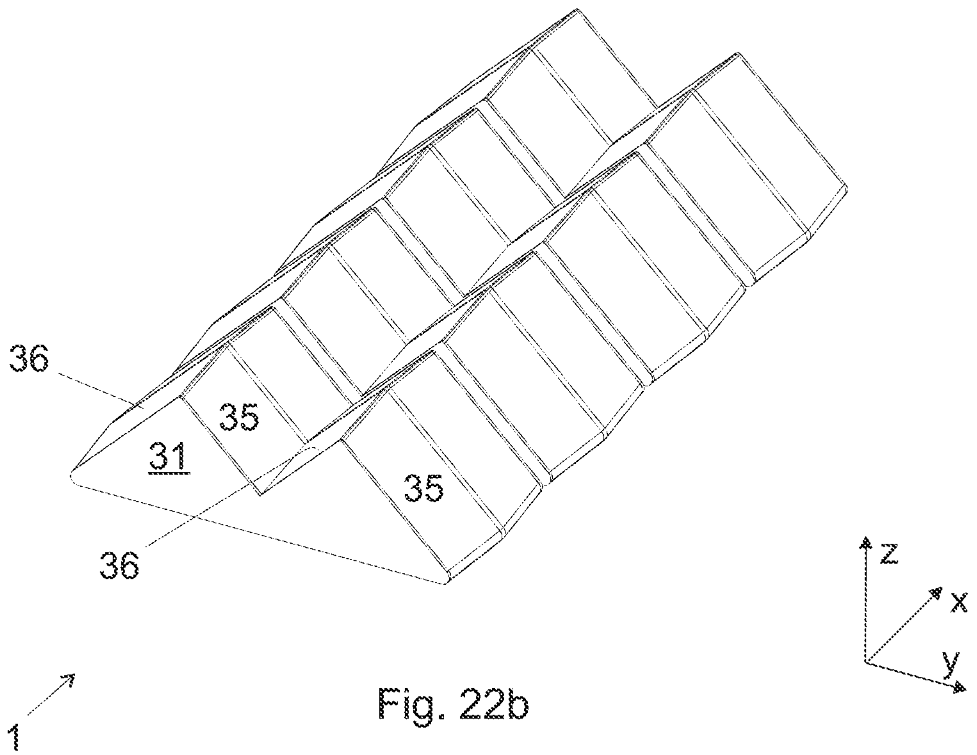
Figure 22C:
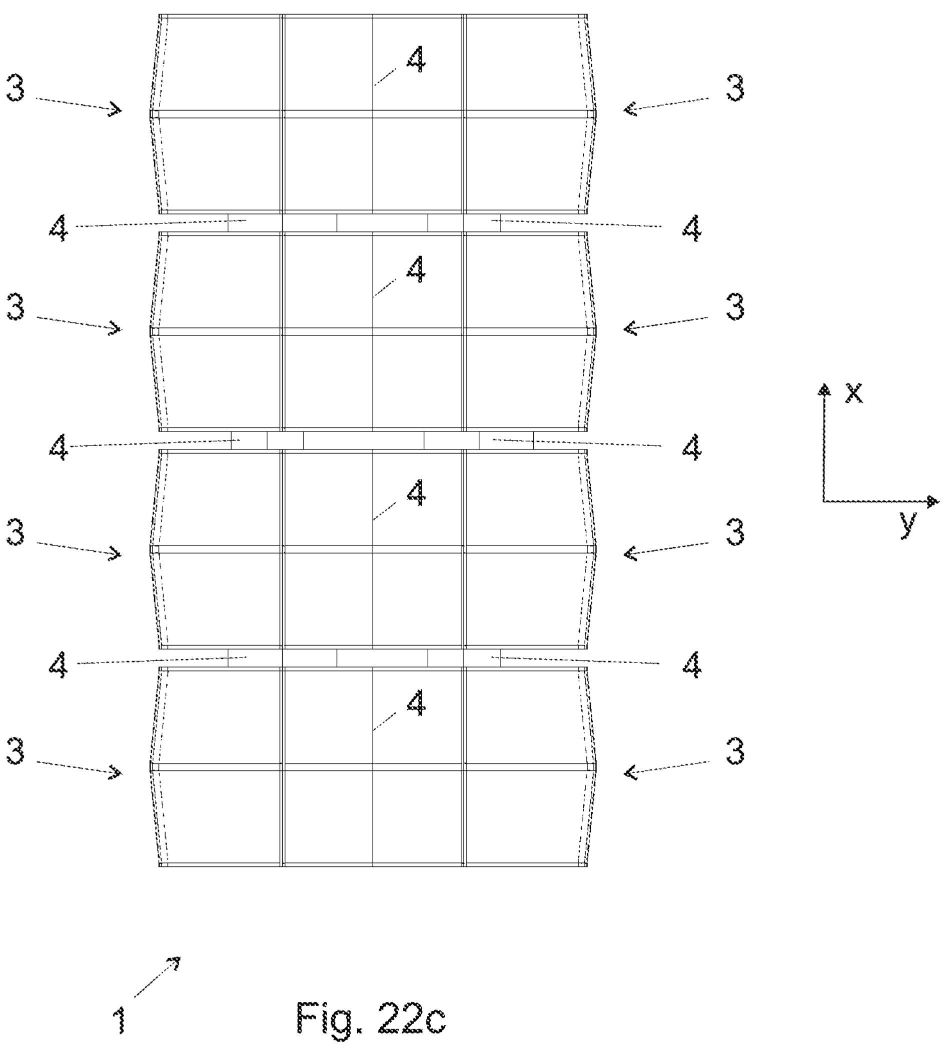

FIGS. 22*a* to 22*c* illustrate a filter comprising eight resonators 3 arranged in four rows of two resonators each. The two resonators in each row are connected to each other by transverse irises 4, here irises of rectangular cross-section. The adjacent rows are connected by several irises, here by irises of different section, here by a triangular iris and another iris of quadrilateral section.

Figure 23A:
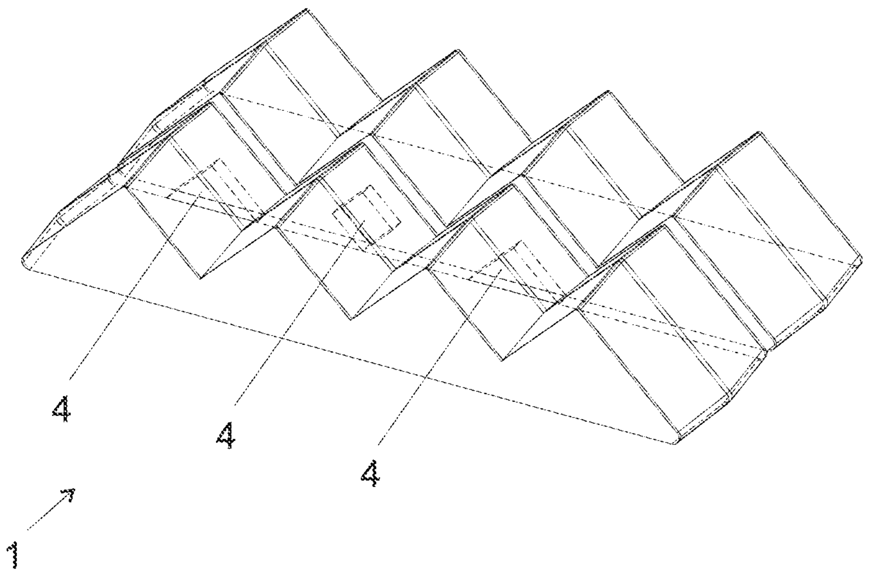
FIGS. 23*a* to 23*c* illustrate different views of a slot waveguide filter, comprising two rows of four resonators each, the adjacent rows being connected to each other by several longitudinal irises with different sections.
Figure 23B:
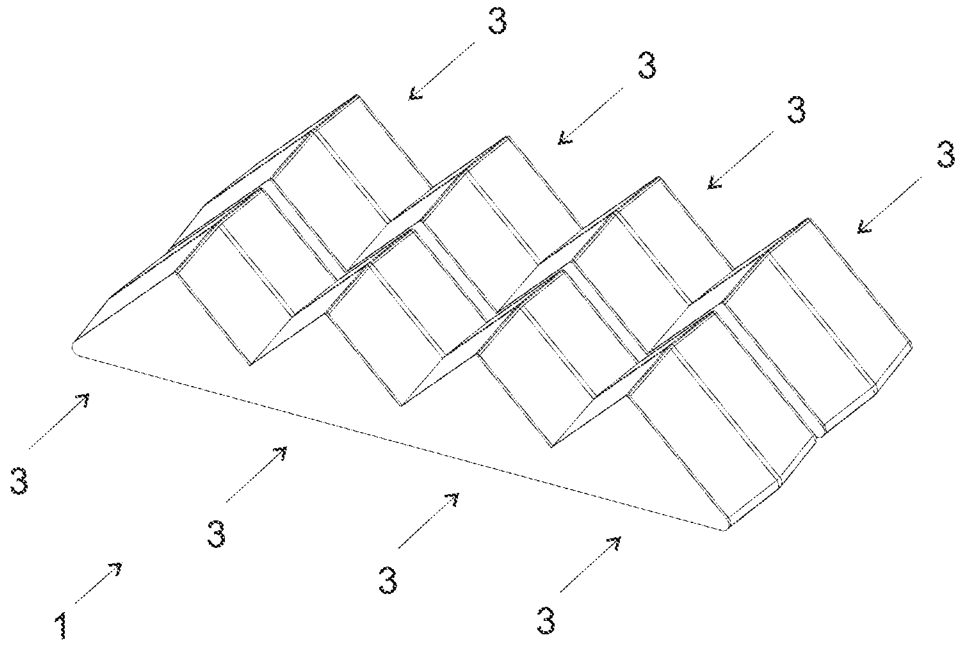
Figure 23C:
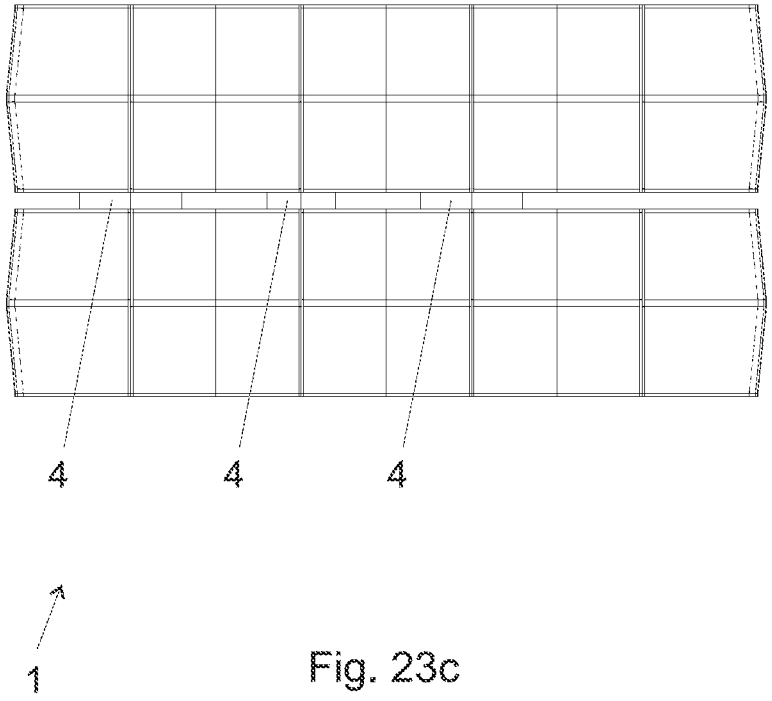

FIGS. 23*a* to 23*c* illustrate a filter comprising eight resonators 3 arranged in two rows of four resonators each. The two resonators in each row are connected to each other by transverse irises 4, here irises of rectangular cross-section. The adjacent rows are connected by several irises, here by irises of different section, here by two triangular irises and two other irises of quadrilateral section.

Figure 25:
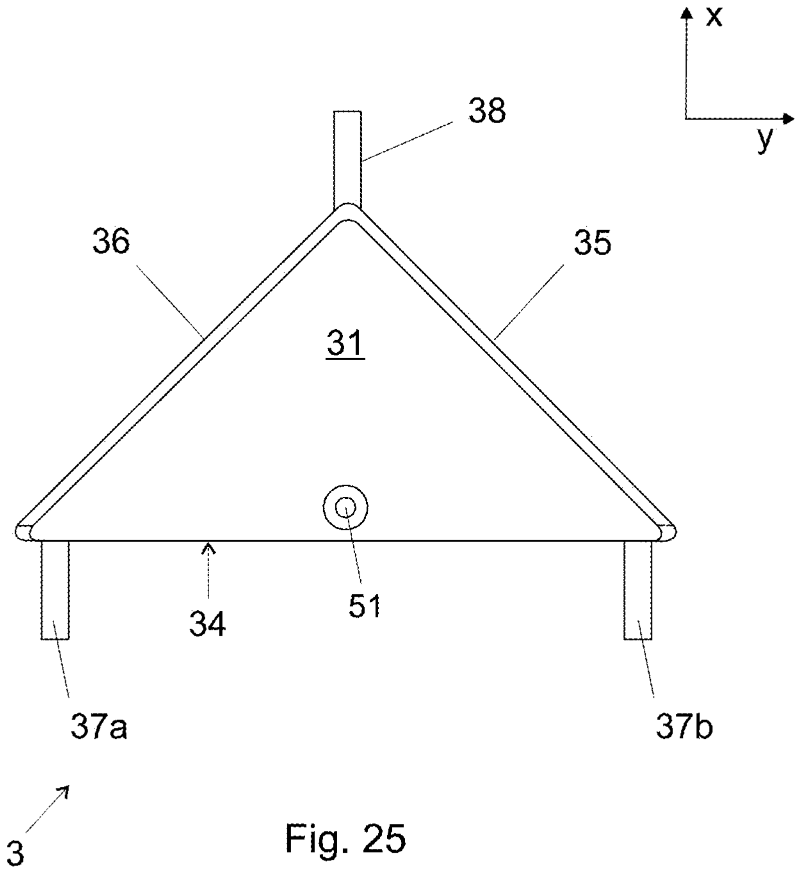
FIG. 25 illustrates a front view (along the longitudinal axis) of an example of a resonator that can be implemented in a metal combline waveguide filter, provided with a threaded hole for a filter cutoff frequency tuning screw, a radio frequency electromagnetic signal input or output port, and holes for a cleaning liquid for the resonator cavity.

FIG. 25 illustrates a resonator 3 provided with holes 37*a*, 37*b* made with the resonator, by additive printing, and intended to allow chemical cleaning of the cavity inside the resonator, by inserting a liquid through these holes after additive printing. Such holes may be provided with any of the described resonator and filter designs.

Figure 26:
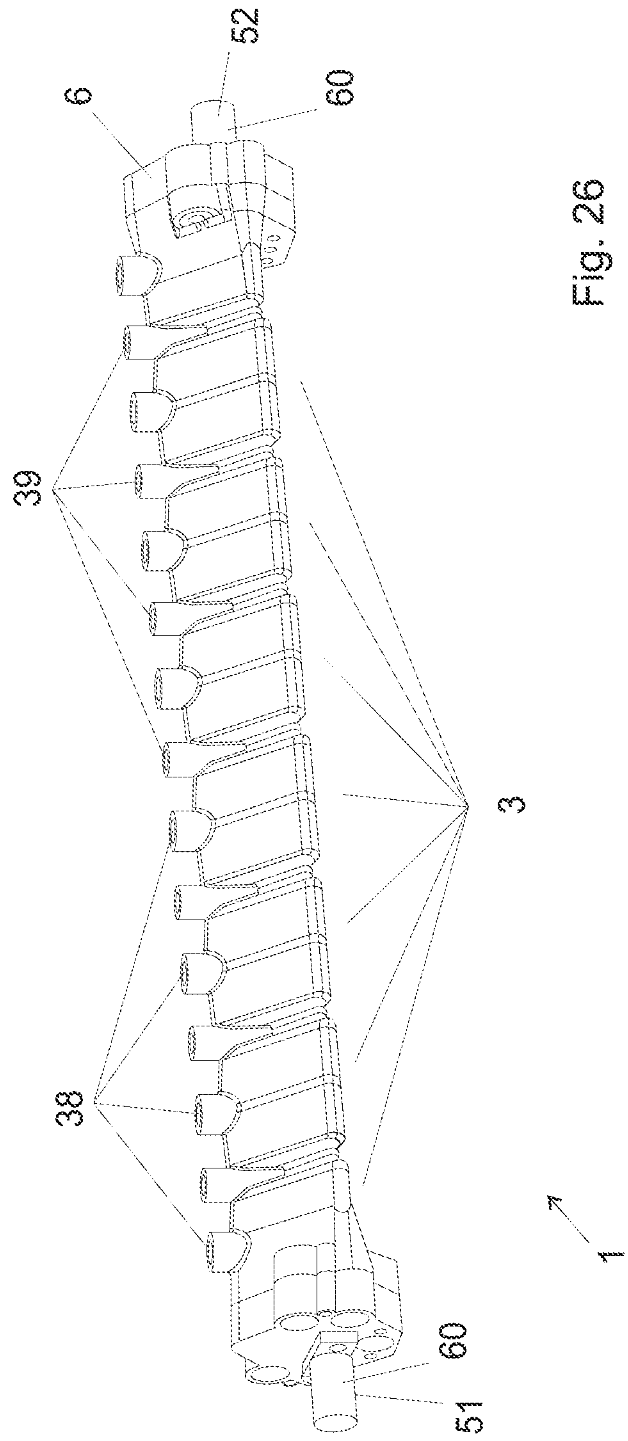
FIG. 26 illustrates a perspective view of a full combline waveguide filter, here a filter with eight resonators connected in line along the longitudinal axis, and two flanges.

FIG. 26 illustrates a filter having eight resonators 3 connected to each other by longitudinal irises. Each iris has a screw 39 extending from the top side of the iris and penetrating the iris to adjust the passband of the filter. Inserting the screw 39 deeper increases the bandwidth of the filter. The filter is monolithically constructed, with all resonators forming a single piece. Only the input 51 and output 52 ports are made on flanges 6 made by subtractive metal machining, and glued to the two ends of the filter. These flanges 6 are provided with a connector 60 for a coaxial cable.

The height of the resonators can be between 8 and 15 mm. Their width along the transverse axis x can be between 15 and 30 mm. Their length may be between 10 and 18 mm. The diameter of the chemical cleaning holes 37 is advantageously less than 2 mm. The frequency adjustment screws 38 may have a diameter between 2 and 5 mm, for example between 3 and 4 mm. The bandwidth adjustment screws 39 may have a diameter between 1.5 and 2.5 mm, for example 2 mm. The cut-off frequency can be between 8 and 30 GHz, with a bandwidth between 100 and 300 MHz. FIG. 24 illustrates the height b, the width a and the length l of such a resonator.

The above description shows different resonators with one or more input ports, different resonators with one or more irises of different types, and different resonators without input ports and irises. These different aspects can be combined with each other. For example, a resonator of any shape, such as one of the shapes described above, may be associated with an iris or set of irises of any of the types described above, and/or with an input port or output port. Resonators of different shapes and sizes may be combined in the same waveguide.

A typical combline waveguide filter comprises a resonator with an input port and at least one iris, a resonator with an output port and at least one iris, and a plurality of resonators connected, for example, in series or in series-parallel circuits between the resonator with the input port and the resonator with the output port, the resonators being connected together by longitudinal and/or transverse irises.

REFERENCE NUMERALS

1 Combline waveguide filter
3 Resonator
30 Cavity
31 Wall
32 Wall
33 Post
34 Base
35 Roof panel
36 Roof panel

350 Curved surface
360 Curved surface
361 Curved surface
37 Conduit
38 Cutoff frequency tuning screw
39 Bandwidth tuning screw
4 Iris
40 Obstacle
51 Input port
52 Output port
6 Flange
60 Connector
P Printing direction
S Printing support
x Longitudinal axis
y Transverse axis
z Vertical axis

What is claimed is:

1. Combline waveguide filter obtained by additive printing of metal, comprising at least two resonators connected together by irises,
each resonator comprising a cavity with a longitudinal axis, a transverse axis and a vertical axis,
each cavity being delimited in particular by two walls each extending in a plane perpendicular to the longitudinal axis to thereby define a cross section,
wherein the cross section of said cavities in a plane perpendicular to the longitudinal axis is non-rectangular, and
wherein each cavity comprises a base perpendicular to the vertical axis and substantially flat and a respective roof above said base, said respective roof being devoid of a planar surface parallel to said base.

2. The combline waveguide filter of claim 1, wherein each cavity comprises a respective post extending parallel to the vertical axis within the cavity.

3. The combline waveguide filter of claim 2, wherein at least one cavity is provided with a tuning screw extending vertically above the post of the at least one cavity in order to adjust the cutoff frequency of the corresponding resonator.

4. The combline waveguide filter of claim 1, wherein said respective roof comprises exactly two panels formed of oblique faces connecting said walls and inclined with respect to said base.

5. The combline waveguide filter of claim 1, wherein said respective roof comprises a plurality of flat panels connected to each other and to the base by curved surfaces.

6. The combline waveguide filter of claim 1, wherein said respective roof has exclusively curved surfaces connecting said walls together.

7. The combline waveguide filter of claim 1, wherein said cross-section is variable in the longitudinal direction.

8. The combline waveguide filter of claim 7, wherein an area of said cross-section increases from longitudinal ends of the cavity toward the longitudinal center of the cavity.

9. The combline waveguide filter of claim 1, wherein at least two longitudinally adjacent cavities in the longitudinal direction are connected to each other by at least one of said irises.

10. The combline waveguide filter of claim 9, wherein the at least one of said irises forms a triangular section.

11. The combline waveguide filter of claim 9, wherein the at least one of said irises forms a quadrilateral cross section.

12. The combline waveguide filter of claim 9, wherein at least two cavities adjacent in the longitudinal direction are connected to each other by two slot irises of the at least one said irises.

13. The waveguide filter of claim 1, wherein at least two cavities adjacent in the transverse direction are connected to each other by at least one of said irises.

14. The combline waveguide filter of claim 13, wherein the at least one of said irises forms a polyhedron with 4 triangular faces.

15. The combline waveguide filter of claim 13, wherein the at least one of said irises forms a polyhedron with two pentagonal faces, two triangular faces and two trapezoidal faces.

16. The combline waveguide filter of claim 13, wherein the at least one of said irises has a rectangular cross-section having an upper edge that is formed by the intersection of two panels of two interlocking cavities from the at least two adjacent cavities.

17. A method of manufacturing a combline waveguide filter according to claim 1, comprising additively manufacturing said resonators by superimposing layers extending in planes perpendicular to the vertical axis.

18. A method according to claim 17, comprising machining a first flange provided with an input port and a second flange provided with an output port, and bonding said flanges to said resonators.

19. The combline waveguide filter of claim 1, wherein at least one cavity comprises a hole for chemical cleaning of the interior of the at least one cavity.

20. The combline waveguide filter of claim 1, wherein said cavities and said irises are monolithically made.

21. The combline waveguide filter of claim 1, comprising an input port for coupling an electromagnetic signal into the filter and an output port for coupling the electromagnetic signal out of the filter.

22. The combline waveguide filter of claim 21, wherein said input and output ports are formed in machined flanges provided with a connector for a coaxial cable and assembled to one of said cavities.

23. The combline waveguide filter of claim 1, wherein at least one iris from the irises is provided with a tuning screw to adjust the passband of the filter.

* * * * *